Figure 1:
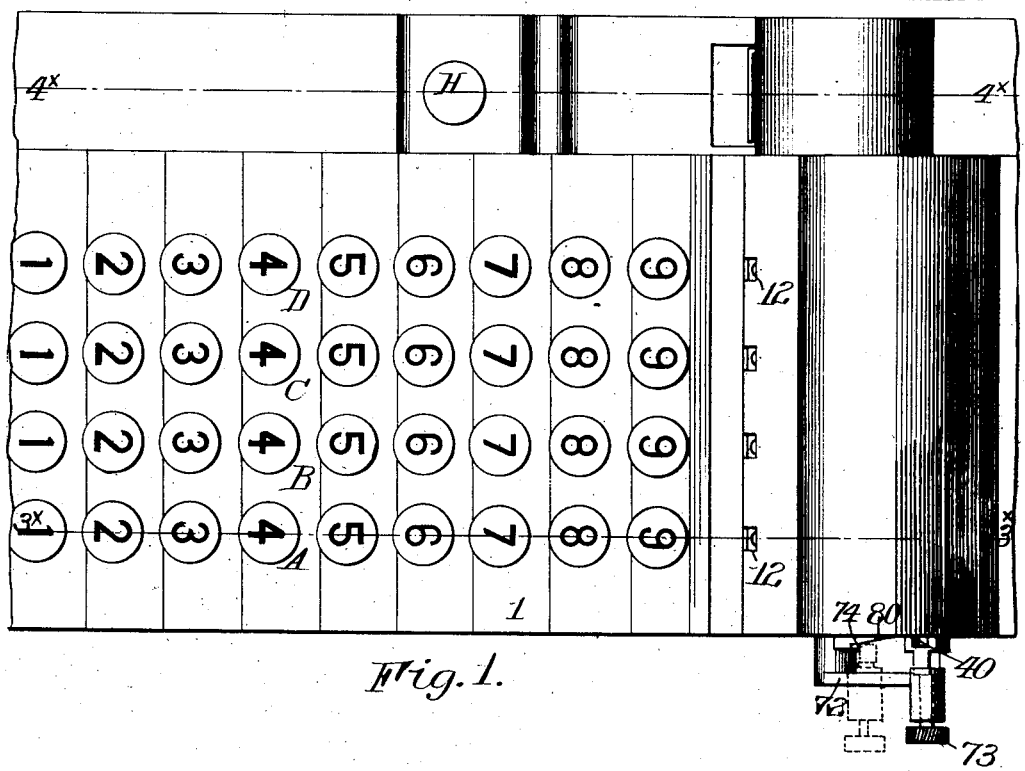

G. H. SEARS.
CALCULATING MACHINE.
APPLICATION FILED FEB. 27, 1903.

961,806.

Patented June 21, 1910.
11 SHEETS—SHEET 1.

Witnesses
Walter B Payne
G Willard Rick

Inventor
George H Sears
By Frederick F Church
his Attorney

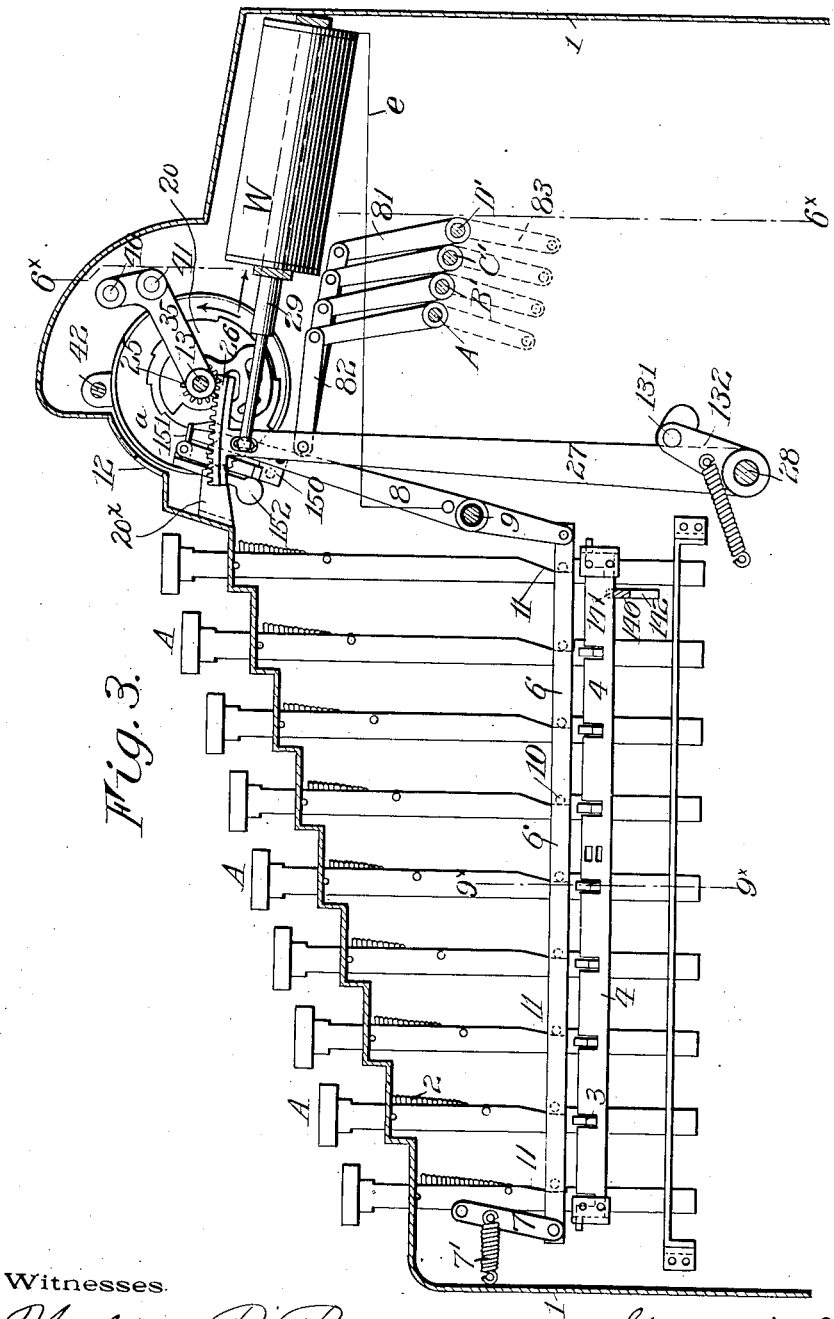

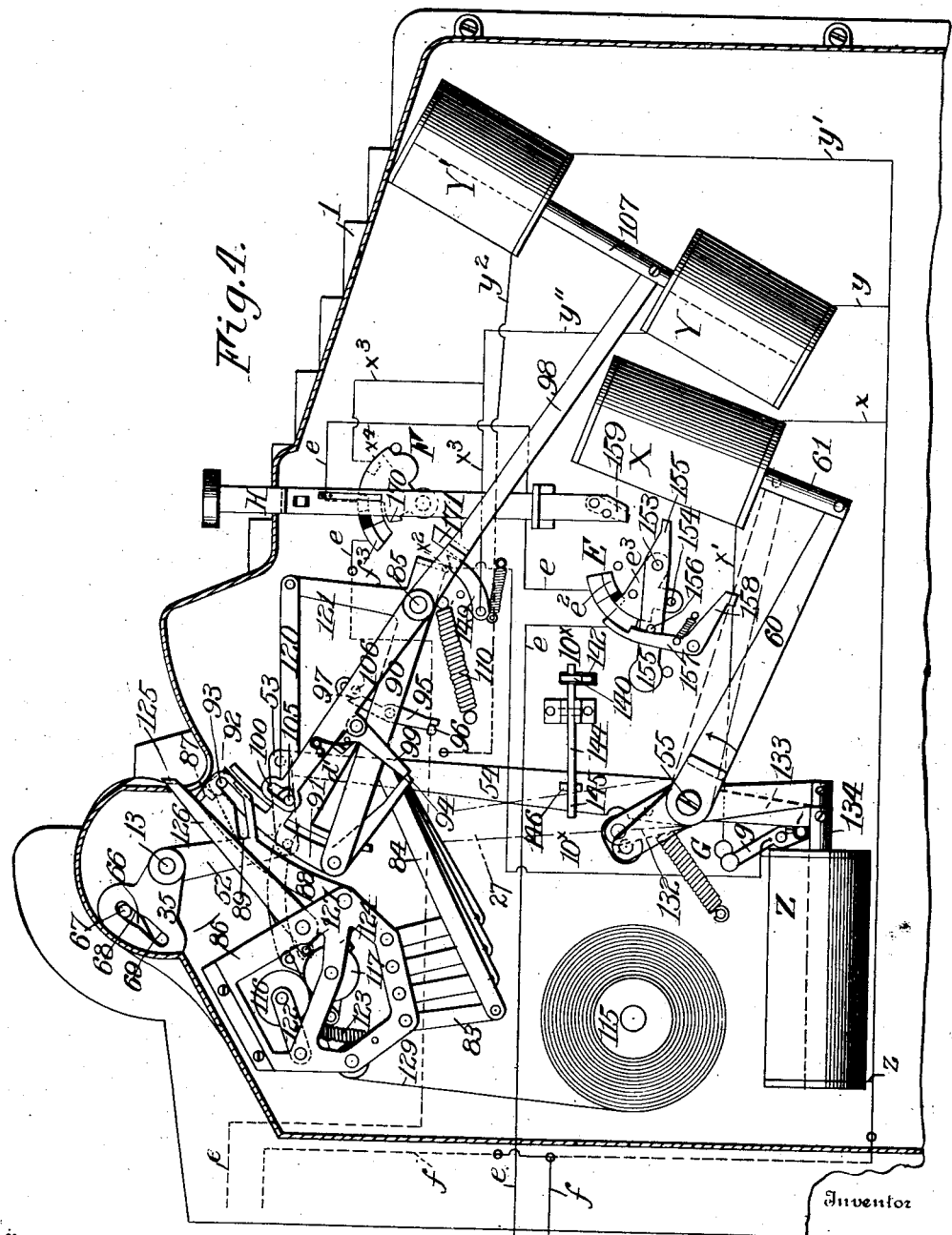

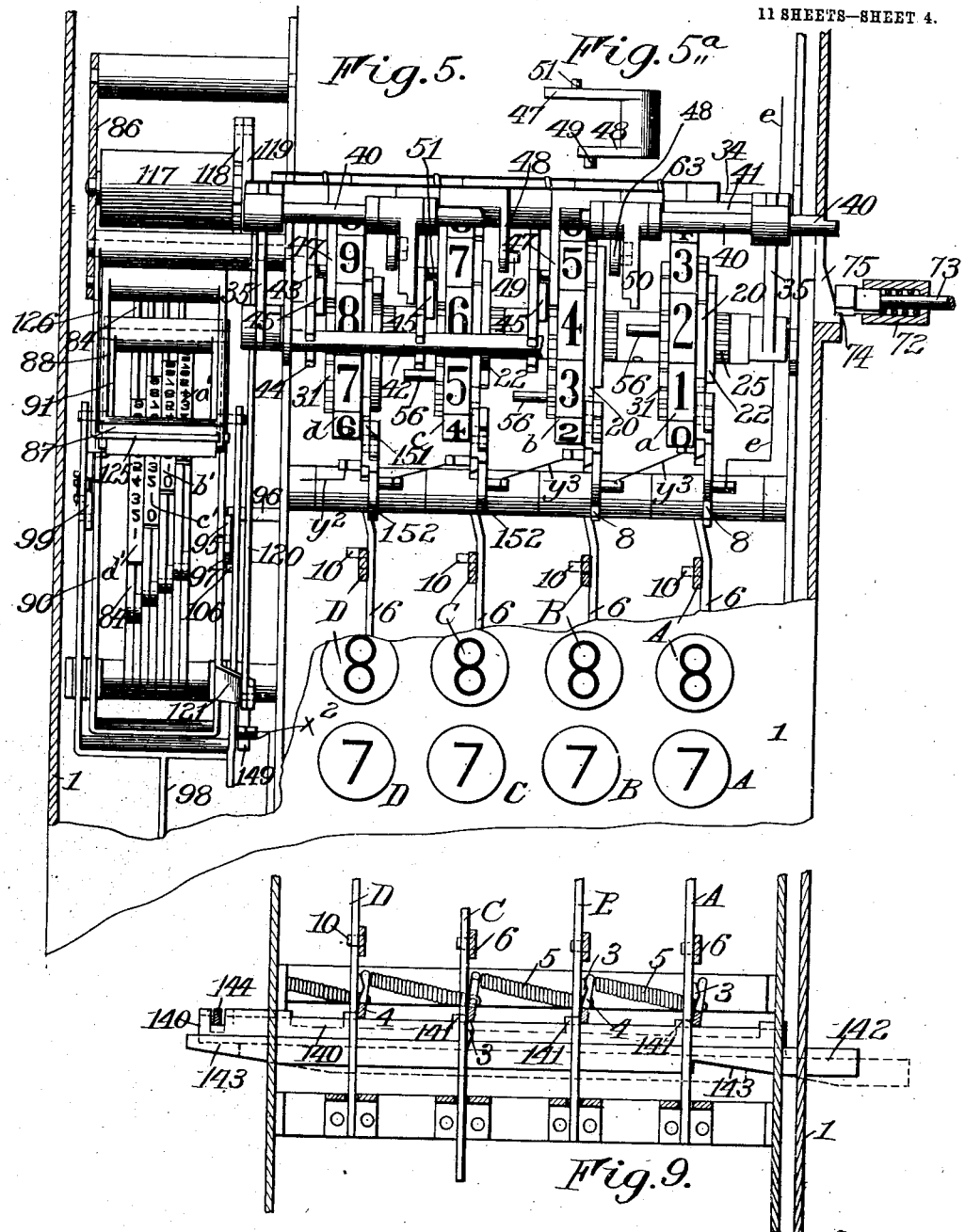

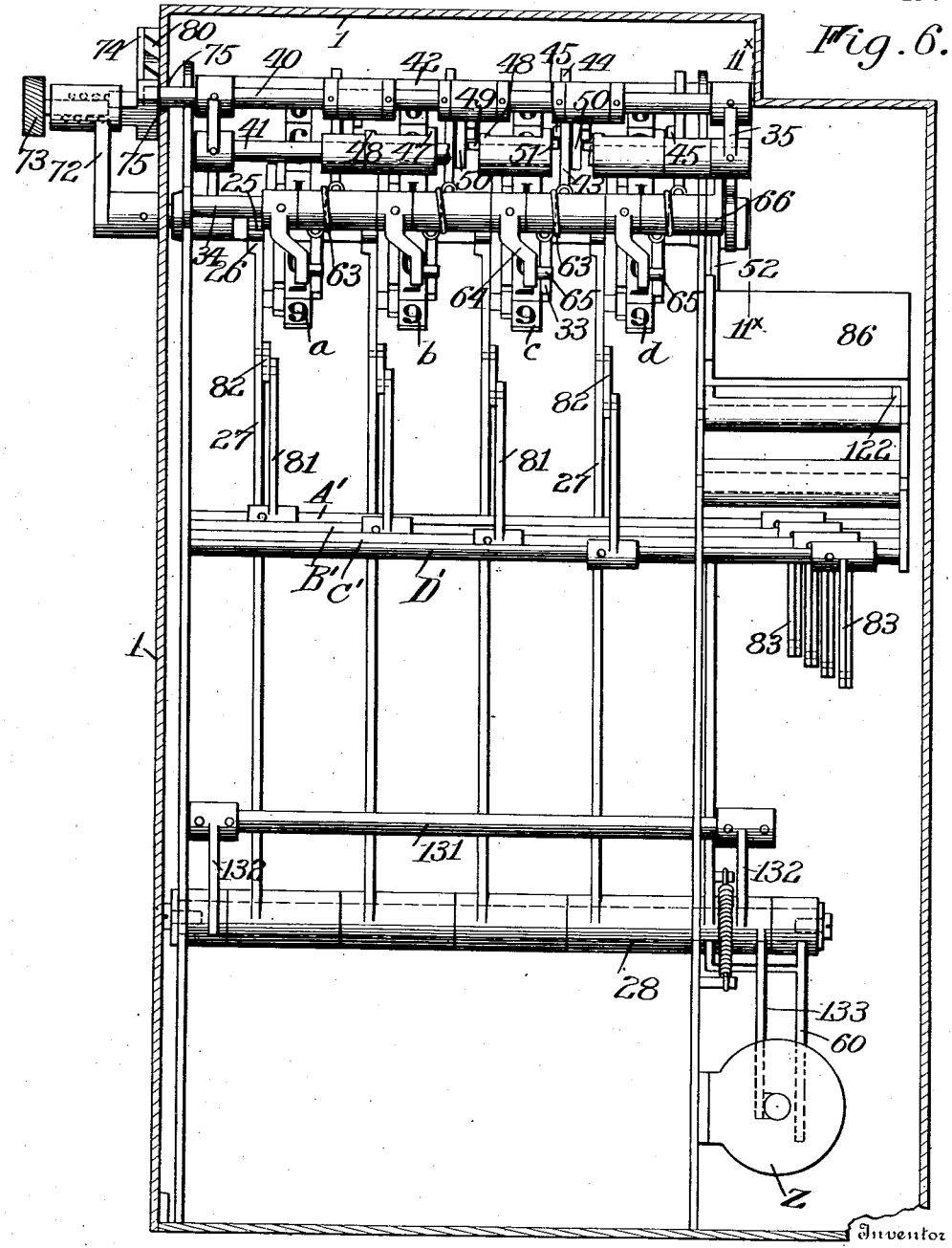

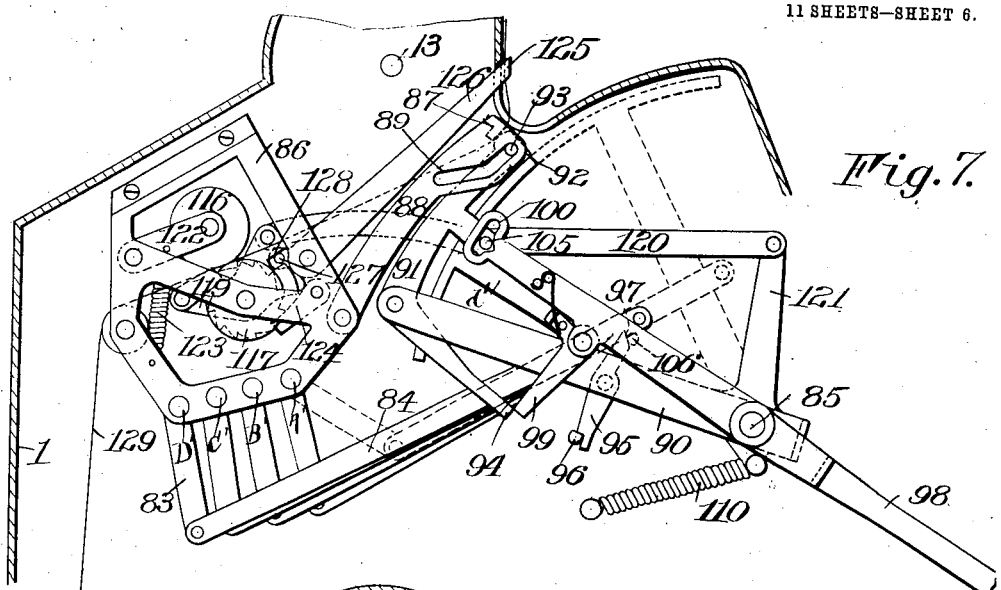
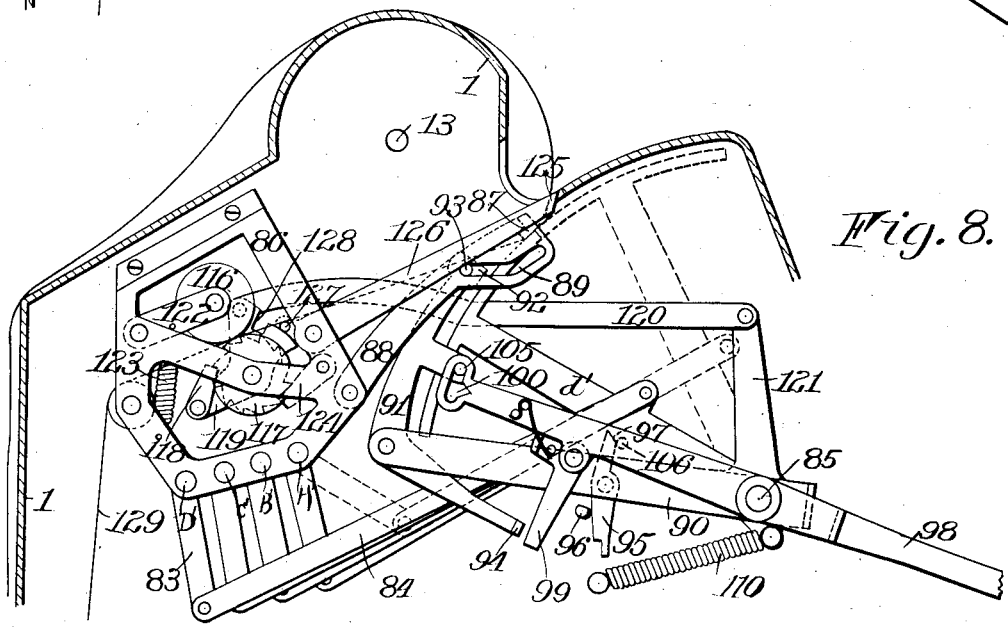

G. H. SEARS.
CALCULATING MACHINE.
APPLICATION FILED FEB. 27, 1903.
961,806.
Patented June 21, 1910.
11 SHEETS—SHEET 7.
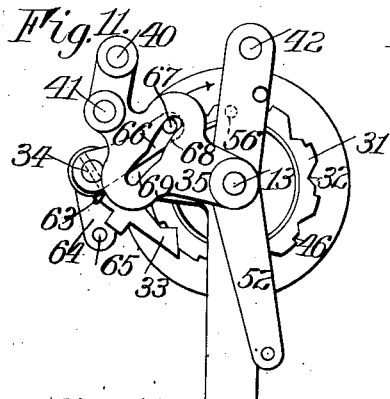
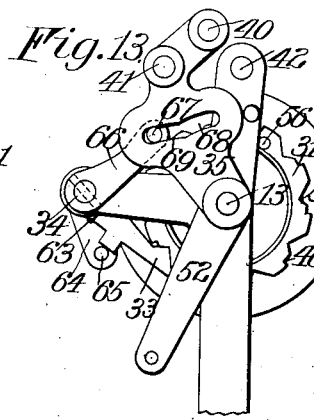
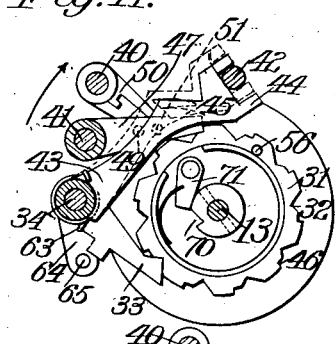
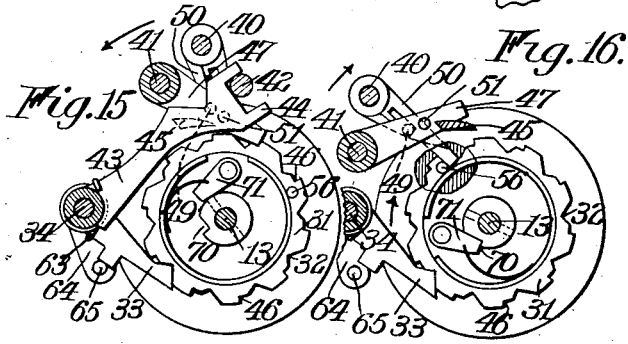
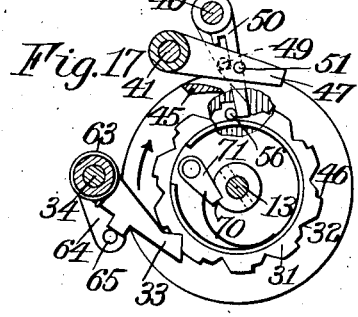
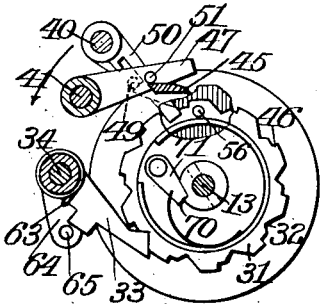
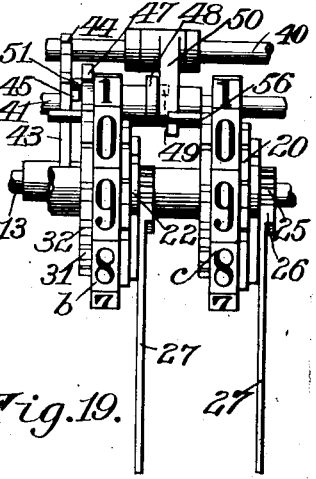
Witnesses
Walter B. Payne.
G. Willard Rich.
Inventor
George H. Sears
By Frederick F. Church
Attorney

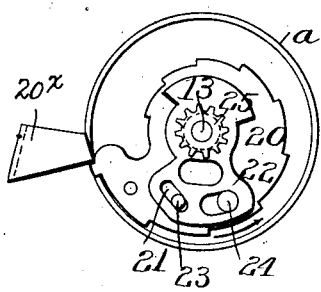
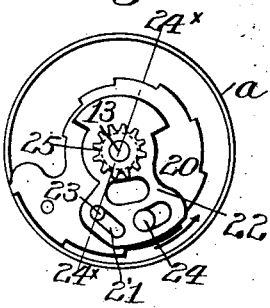
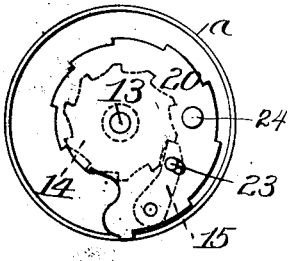
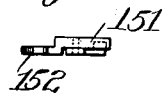
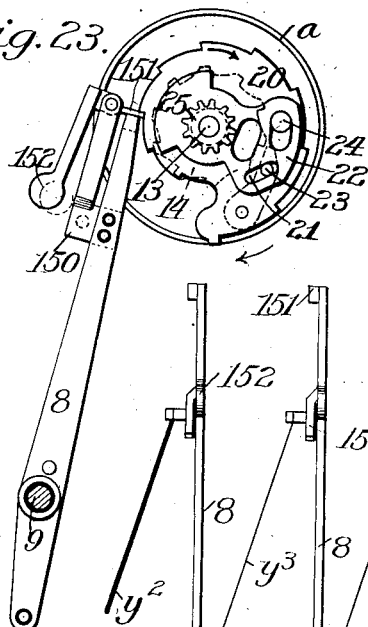
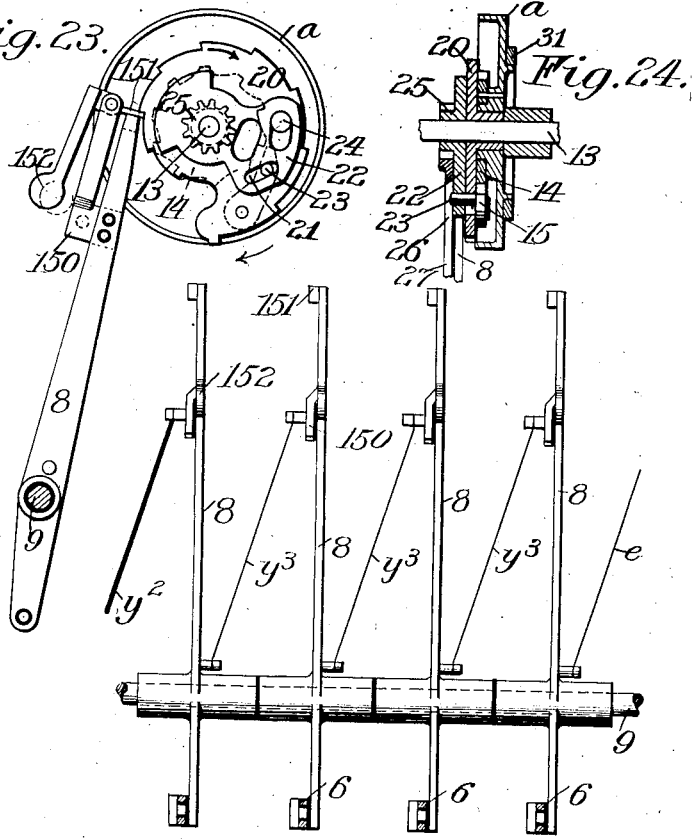

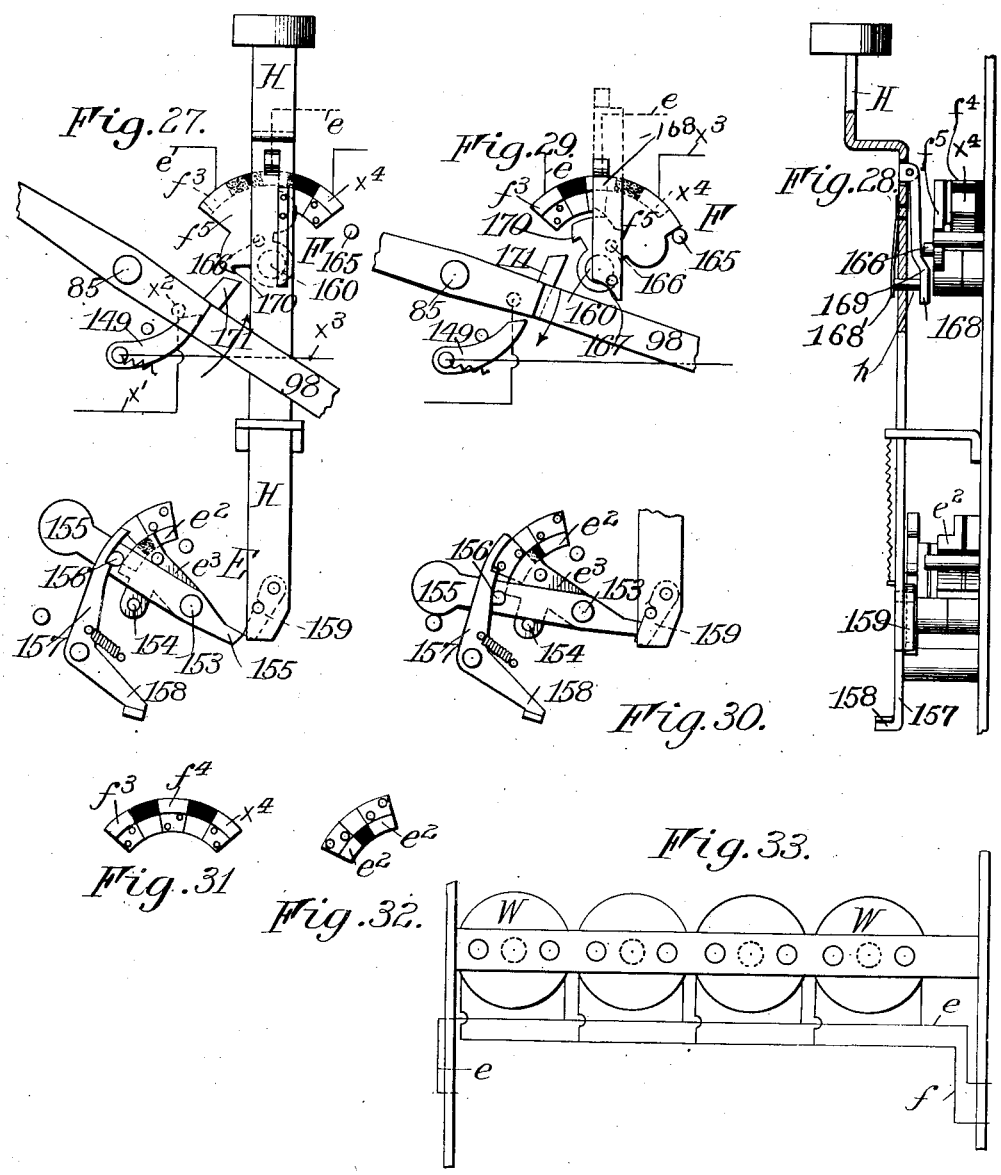

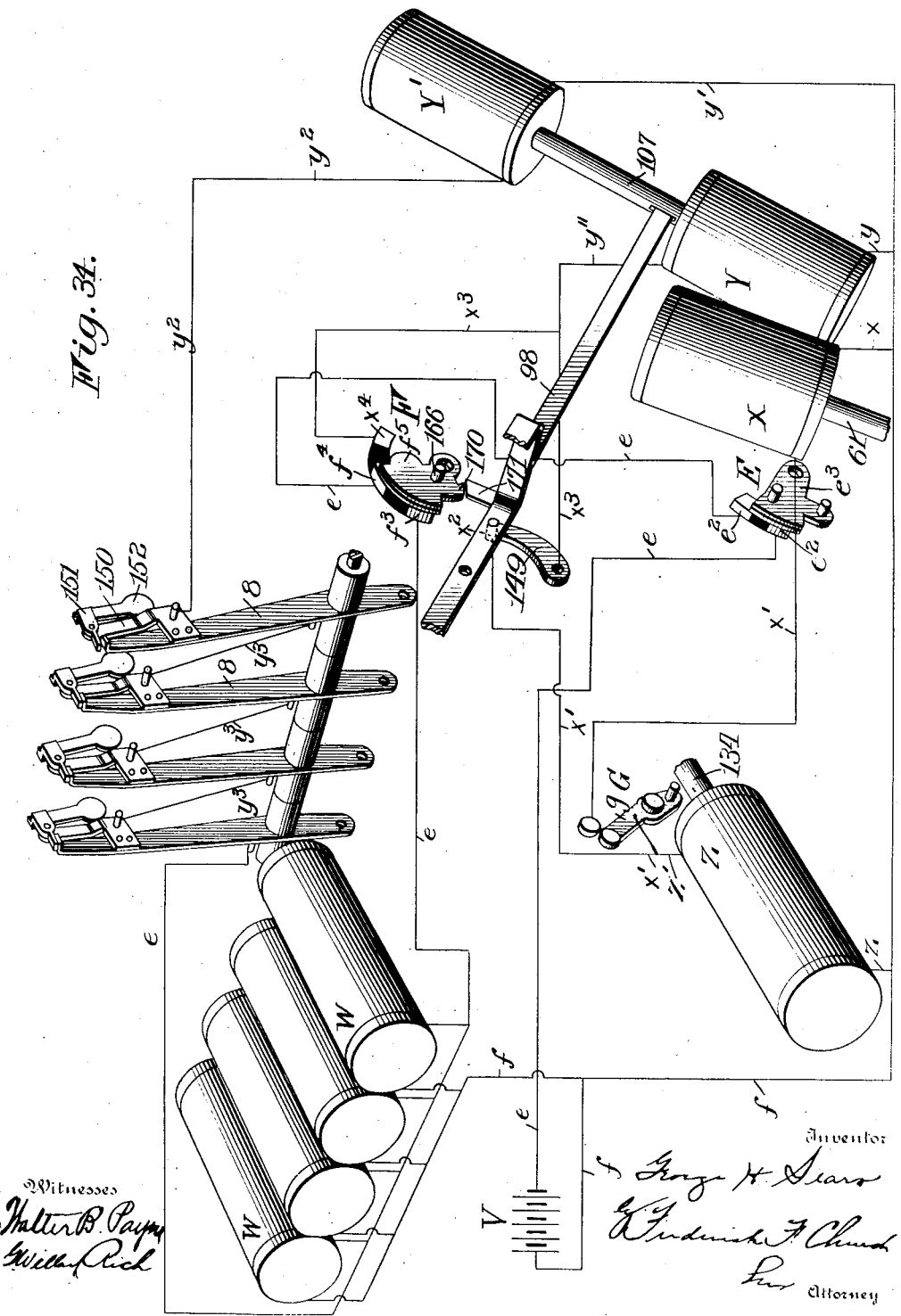

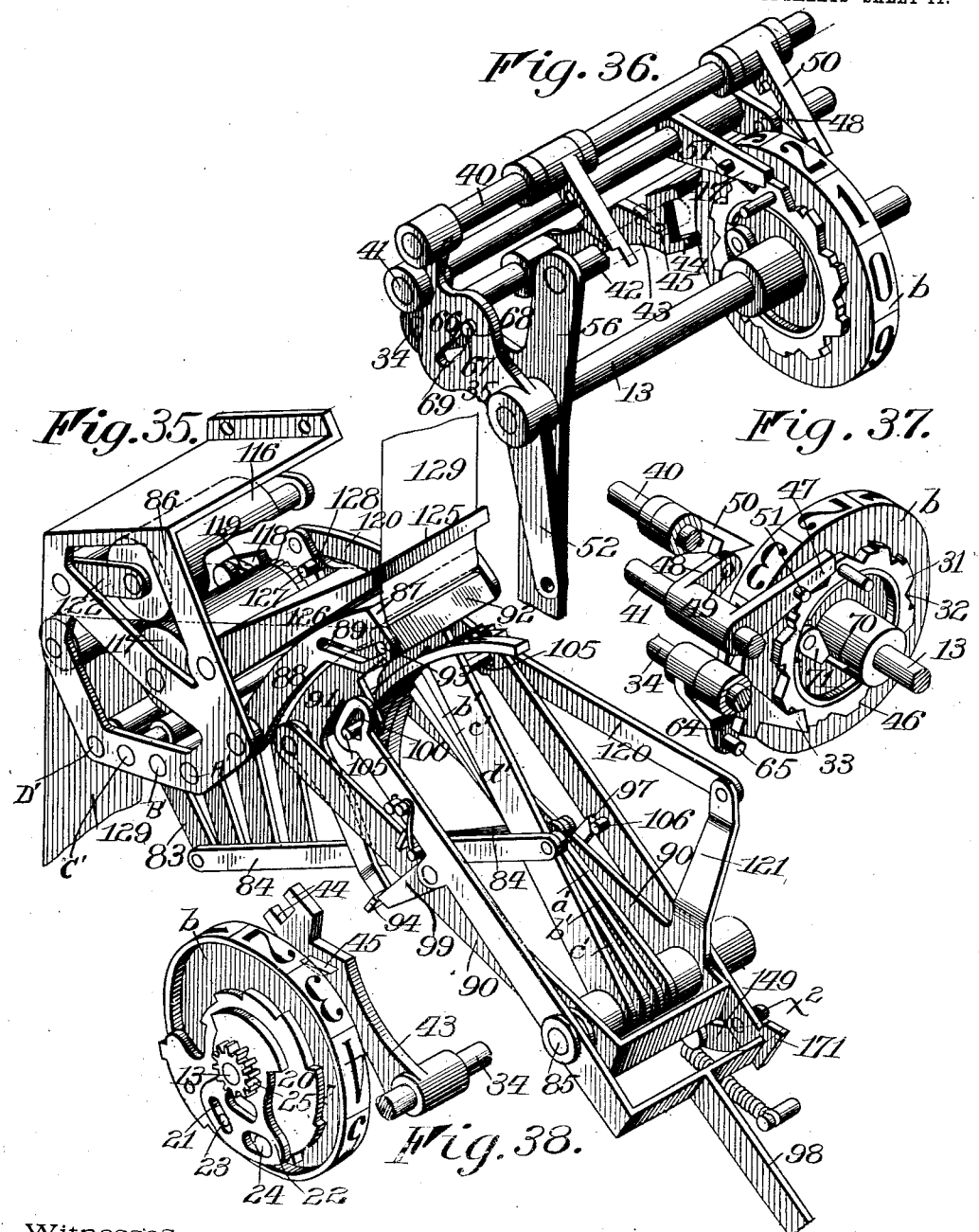

UNITED STATES PATENT OFFICE.

GEORGE H. SEARS, OF ROCHESTER, NEW YORK, ASSIGNOR, BY DIRECT AND MESNE ASSIGNMENTS, OF THREE-FOURTHS TO ANGUS E. HUTHER AND WARREN B. HUTHER, OF ROCHESTER, NEW YORK.

CALCULATING-MACHINE.

961,806.  Specification of Letters Patent.   Patented June 21, 1910.

Application filed February 27, 1903. Serial No. 145,340.

*To all whom it may concern:*

Be it known that I, GEORGE H. SEARS, of Rochester, in the county of Monroe and State of New York, have invented certain new and useful Improvements in Calculating-Machines; and I do hereby declare the following to be a full, clear, and exact description of the same, reference being had to the accompanying drawings, forming a part of this specification, and to the reference characters marked thereon.

My present invention relates to calculating machines, and it has for its object to provide a device embodying a plurality of counter mechanisms and a series of keys each adapted to move setting devices into coöperative relationship therewith whereby their respective counter mechanisms may be operated separately from the keys.

My invention has for its further object to provide such an arrangement of the parts that an error in striking an operating key may be corrected, and it also provides a printing mechanism for making an accurate tally of the result of each operation and devices for resetting or restoring all of the parts to their normal position.

Another object of my invention is to provide suitable motors or means for operating the counters and printing mechanisms and resetting devices whereby said parts may be operated successively and at proper relative times.

To these and other ends the invention consists of certain improvements and combinations of parts, all as will be hereinafter more fully described, the novel features being pointed out in the claims at the end of the specification.

Figure 2:
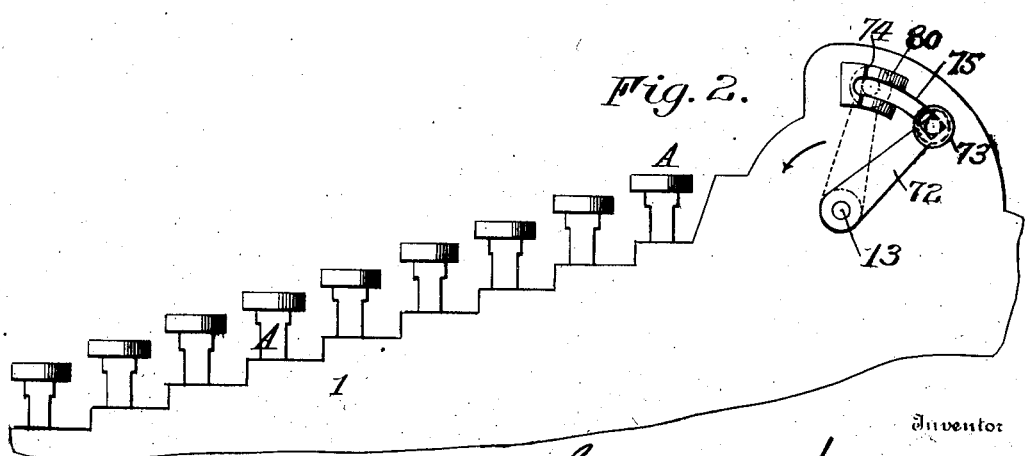

In the drawings: Figure 1, is a top plan view of an adding machine constructed in accordance with my invention. Fig. 2, is a side elevation thereof showing the operating keys. Fig. 3, is a cross sectional view taken on the line $3^x$—$3^x$ of Fig. 1. Fig. 4 is a similar view on the line $4^x$—$4^x$ of Fig. 1 and illustrating the construction and operation of the printing mechanism. Fig. 5, is a plan view of a machine partly in section showing the counter wheels and printing mechanism. Fig. $5^a$, is a detail view of a counter operating pawl. Fig. 6, is a cross sectional view on the line $6^x$—$6^x$ of Fig. 3. Figs. 7 and 8, are detail views illustrating the operation of the printing mechanism. Fig. 9, is a detail sectional view on the line $9^x$—$9^x$ of Fig. 3. Fig. 10, is a detail view on the line $10^x$—$10^x$ of Fig. 4. Figs. 11, 12 and 13 are detail views of the counter operating mechanism taken on the line $11^x$—$11^x$ of Fig. 6. Figs. 14 to 18, are similar views showing the operation of the carrying devices between adjacent counter wheels and also the operation of devices when the parts are moved manually to return them to the zero position. Fig. 19, is a side elevation of the parts of two adjacent counter wheels in the position shown in Fig. 18. Figs. 20 and 21, are side elevations of one of the counter wheels with the operating parts mounted thereon. Fig. 22, is a similar view with the shifting plate removed and showing the underlying parts. Fig. 23, is a view illustrating the operation of one of the stop levers in connection with its counter wheel. Fig. 24, is a cross sectional view on the line $24^x$—$24^x$ of Fig. 21. Fig. 25 is an elevation of the several stop levers. Fig. 26, is a plan view of one of said levers. Fig. 27, is a detail side view of the controlling key and parts operated in connection therewith, said key being shown in the operated position. Fig. 28, is a similar view of the parts in end elevation. Fig. 29, is a detail view of the main controlling switch. Fig. 30, is a similar view of the secondary controlling switch. Figs. 31 and 32 are detail views of the contact members forming parts of the switches illustrated in Figs. 29 and 30. Fig. 33 is a detail view of the magnets for operating the several counter mechanisms, and Fig. 34, is a diagrammatic view showing the electrical circuits. Fig. 35 is a perspective view of the printing mechanism illustrated in Figs. 7 and 8. Fig. 36 is a similar view of the counter operating and transfer mechanism. Fig. 37 is a detail perspective view of one of the counter wheels, and Fig. 38 is a similar view thereof showing the stop plate.

Similar reference characters in the several figures indicate similar parts.

An adding machine constructed in accordance with my invention embodies a plurality of counters which are arranged to indicate the units, tens, hundreds and thousands places, etc., each of which are adapted to be operated consecutively from zero through the digits reading from one to nine by suitable means, their movements being controlled by keys or other devices, the separate rows of which beginning with units are indicated A, B, C and D. These keys are supported in a frame 1 and guided to move vertically and they are held in their normal position by means of a small coil spring 2. Upon the sides of the keys are provided lugs or extensions 3 the upper ends of which form abutments adapted to engage beneath the edge of a swinging lock bar 4, when the keys are depressed, which is held yieldingly in engagement with the sides of the keys by means of springs 5, as shown in Figs. 3 and 9. These lugs are provided with a rounding or angular surface on their outer sides so that a point intermediate the ends of the lug projects beyond the upper end or abutment operating, when a key is depressed, to move the locking bar 4 outwardly beyond the abutments a sufficient distance whereby another key in the same row, which may have been previously depressed, will be released. The purpose of this arrangement is to allow an operator to correct a mistake in case an error has been committed in depressing a wrong key or to change a computation without resetting the entire mechanism. Extending at the side of each row of keys is a setting bar 6 attached at its outer end to a pivoted link 7 and at its opposite extremity to one end of its setting lever 8, journaled upon a shaft 9, said bars being held in their normal positions by means of a spring 7'. Arranged upon the bar 6 are studs or pins 10 with which are adapted to engage cam surfaces 11 on the operating keys, said surfaces being graduated, as shown in Fig. 3, to move the setting bar and the setting lever a number of spaces relative to the figure indicated by the key. Thus when the first key is depressed the lever is moved one space and when the last key is operated it is moved through nine spaces.

Located in the upper part of the casing is the counter mechanism embodying counter wheels, one of which is arranged for each of the sets of operating keys A, B, C and D having provided upon their peripheries the numerals reading from zero to nine which may be viewed through suitable apertures 12 in the casing. These wheels indicated by a, b, c and d are mounted on a shaft 13 and as they are similar in construction a description of one will be sufficient for all. At one side of the counter wheel is provided a ratchet wheel 14 (see Figs. 22 and 23) with which is adapted to engage a pawl 15 pivotally mounted upon a spirally stepped stop plate 20, journaled on the shaft 13 and movable in one direction independently of its counter wheel, and when moved in the opposite direction the latter is carried with it by engagement of the pawl 15 with a tooth of the ratchet wheel 14, the operation of the pawl being accomplished by the coöperative action of a cam slot 21 in a relatively movable shift plate 22 and a pin 23 secured to the pawl 15, the amount of the movement of said plates being limited by the setting lever 8 engaging with one or another of the notches of the stop plate 20. The shift plate is also journaled on the shaft and its movement relatively to the stop plate 20 is limited by means of a pin 24 thereon which extends into an elongated aperture, as shown in Figs. 20 and 21, whereby the plate is only permitted to move a sufficient distance to move the pawl 15 into and out of operative position before its rotary movement is transmitted to the plate 20. At one side of the shift plate is provided a small pinion 25 and engaging therewith is a counter actuator in the form of a segmental gear 26 mounted on the arm 27, journaled at its lower end upon a shaft 28. The counter actuators are operated by electromagnetic devices arranged, in the present instance, in the form of solenoids W (Figs. 3 and 34) in which operate cores 29 attached to the arms 27 whereby the pinions 25 are operated in one direction to revolve their stop plates 20 and their respective counter wheels and in the opposite direction to return the stop plates to their normal position in engagement with stationary stops, indicated by 20˟ (see Figs. 3 and 20). These stops are positioned so that when the plates 20 are arrested the shoulders thereon, corresponding to the zero position of the counter wheels, may pass beyond the ends of the setting levers 8 and the lips 151 thereon. Arranged at the other side of the counting wheel and secured thereto is a combined carrying and locking ratchet wheel 31, having the V-shaped notches 32, with which engages the pawl 33, mounted on a rock shaft 34 journaled in the frame 1.

Loosely journaled on the shaft 13 at the ends thereof is a swinging frame embodying the end portions 35 see Figs. 26, 37 and 38 in which are carried rods or shafts 40 and 41 extending over the counter wheels and supporting the carrying devices by means of which the higher or succeeding counter wheels are operated through one space at the completion of the rotation of the relative lower counter wheel, as will be understood. These devices and their operation are illustrated in detail in Figs. 11 to 18 and to these figures reference will now be made particularly. Extending between the sides of the frame 1 and above the counter wheels is a stationary bar or rod 42 and journaled on the shaft 34 is a movable arm 43 provided at its outer end with fingers 44, arranged on opposite sides of the bar 42 to limit its swinging movement and on the side of the arm is a laterally extending tripping cam or projection 45. At one side of each of the V-shaped notches or depressions in the ratchet wheel 31 are shoulders or teeth 46 with which is adapted to engage a member or pawl 47, journaled on the shaft 41, and provided with a sleeve on which is an arm 48, so arranged that it lies centrally between the counter wheels (see Figs. 5 and 5ª). This arm is provided with a pin 49 with which engages a pivoted latch member 50, mounted on the shaft 40, and adapted to hold the pawl out of engagement with the ratchet wheel 31 during certain movements of the machine, as will be further described. The pawl 47 is provided with a pin 51 coöperating with the relatively stationary tripping projection 45, on the arm 43, which passes under said projection when it is operating to advance its counter wheel one space, as shown in dotted lines in Fig. 14, but when it is retracted the pin 51 engaging the projection 45 causes the pawl 47, attached to the arm 48, to be elevated sufficiently to permit the latch member 50 to engage therewith, as shown in Figs. 16 and 18. The several latch members 50 are arranged with their ends extending beyond the peripheries of the ratchets 31 and are adapted to be engaged by pins 56 thereon whereby they are tripped when their respective counting wheels are revolved through the ten spaces allowing the pawls 47 on the relatively higher wheels to move into operative position. A similar operation occurs when each of the other counter wheels is revolved from the nine to the zero position, as will be understood. Successive carrying from one counter wheel to another is permitted by proportionately shortening of the pawls 47 coöperating with the hundreds and higher counter wheels to permit them to drop into the notches in the ratchet wheels 31 when the carrying frame has been moved sufficiently to actuate the tens, hundreds, etc., counter wheels successively to release the several pawls. To this end the amplitude of movement of the carrying frame is such that the longest pawl 47 engaging the tens wheel will revolve it through a distance greater than the space between the numerals on its periphery. This enables the pawl coöperating with the hundreds and thousands wheels to be shortened in length and if a counter wheel is not brought into accurate position by the forward movement of the carrying frame it will be further adjusted forwardly or rearwardly by the centering pawls 33 which are positively operated during the movement of the carrying frame. One of the ends 35 of the carrying frame is provided with an arm 52 connected, by means of a link 53, with one arm 54 of a bell crank lever, pivoted at 55, the other arm 60 of the said lever being connected to a core 61 of an electromagnetic operating device X, as shown in Fig. 4. It will be seen from the above that when the bell crank lever is operated the carrying frame is oscillated from the positions shown in Figs. 11 and 14 to that shown in Figs. 13 and 15 thereby causing the operation of each one of the counter wheels whose engaging members or pawls 47 have been moved into the operative position. The pawls 33 are held normally in engagement with their ratchet wheels by means of springs 63 and the accidental overthrow or movement of the counter wheel is prevented by a locking member, controlling the movement of said pawl such as an arm 64 secured to the rock shaft and provided with a pin or finger 65 extending in rear of the pawl 33. The shaft 34, as before mentioned, is journaled in the frame 1 and at one end it is provided with the arm 66 carrying a pin 67 lying in a cam slot in one of the end pieces 35 of the carrying frame. This slot is provided with a portion 68 which is arranged concentric to the center of movement of the frame and with a portion 69 arranged at an angle thereto. The locking members are normally out of engagement with the pawls 33, as shown in Fig. 11, and the first part of the movement of the carrying frame does not operate the rock shaft. This allows the counter wheels to be revolved by their pawls 47, to the position shown in Fig. 12, at which time the cam slot 69 begins to raise the arm 66 causing the arms 64 to follow the pawls as they drop into the succeeding notches in the ratchet wheels 31, preventing their outward movement, and limiting any further rotation of the counter wheels until the carrying frame has been returned to its normal position.

In order to restore all of the counter wheels to the original or zero position at the completion of each operation, I provide the shaft 13 with small collars arranged adjacent the several counter wheels having single notches 70 therein, (see Figs. 14 and 37) with which is adapted to engage a spring operated dog or pawl 71 pivoted on the counter wheel. At the end of the shaft 13 and arranged exteriorly of the casing is an operating handle 72 (see Figs. 1, 2 and 6) carrying a spring operated plunger 73, which in the normal position abuts against a stop 74 on the side of the casing. The shaft 40 on the carrying frame is also provided with its end extending through a slot or aperture 75, in line with the circle described by the rotary movement of the plunger, and is adapted to be engaged by the latter just before the handle 72 completes the cycle of movement to oscillate the carrying frame on the shaft 13 to advance the pawls 47 with the counter-wheels, at the end of their movement, to carry the pins 51 from beneath the tripping projections 45 so that when the frame is released and permitted to drop back to its normal position, the pawls 47 will be elevated and held out of operative position by the latch members 50. For this reason I have broadened the engaging end of the plunger and at each side of the aperture 75 are arranged inclined guides or ways 80 leading to the stop 74, which are adapted to move the plunger outwardly sufficiently to disengage the shaft 40 allowing it to return to its normal position, as will be understood.

In connection with the above described adding or computing devices I employ a suitable recording or printing mechanism which is so arranged that the operator may if he desires cause the results of the various computations to be printed upon a ribbon or tape which may afterward be removed. Extending transversely of the machine are a series of rock shafts A', B', C' and D', as shown in Figs. 3 and 6 provided with lever arms 81 connected respectively, by links 82, with the several counter actuator arms 27. These shafts are provided at one end with crank arms 83 connected by means of links or arms 84, with segmental printing beds a', b', c' and d' journaled upon a stud or shaft 85 secured at one side of the frame (see Figs. 7 and 8). The printing beds are provided with the numerals reading from zero to nine, corresponding with those upon the peripheries of their corresponding counter wheels, and the connection between the operating mechanism for the latter and the beds is such that they are revolved about their center so that the numerals thereon, corresponding to the numerals to be viewed through the aperture 12, are arranged in alinement or printing position and adapted to be operated upon by suitable printing devices.

Extending at one side of the frame 1 is a supplemental frame 86 (see Fig. 5) and journaled therein is a frame carrying the platen 87 embodying the side arms 88 each of which is provided with a cam slot 89, as shown in Figs. 7, 8 and 35. Journaled on the shaft 85 is a yoke frame 90 having the ends extending beyond the printing beds and supporting a frame 91, carrying an inking pad 92, and provided with pins 93 engaging in the cam slots 89 and also provided with an operating end or arm 94 extending toward the center or journal point of the yoke frame. 90. Also supported on this frame is a latch member 95 engaging a pin 96 on the frame 1 and provided with an upwardly extending beveled end 97, for a purpose to be further described. The prime mover for operating the inking frame and the platen consists of an operating member or lever 98 journaled on the shaft 85 and provided with a pivoted trip arm 99 adapted to engage the arm 94, when the lever 98 is moved in one direction, to cause the inking pad to contact with the printing beds. At the outer end of the lever 98 is provided a slot 100 and lying therein is a pin 105, arranged upon the frame 91, and also provided upon said lever is a pin 106 which coöperates with the end 97 of the latch 95 to disengage it from the pin 96, as shown in Fig. 8, the slot and pin connection between the frame 91 and the lever 98 permits the inking pad to contact with the printing beds, while the relative downward movement of the lever 98 disengages the trip arm 99 from the arm 94. This releases the yoke frame 90 and the continued movement of the lever 98, then moving the frame 91 by means of the pin 105, causes it to be shifted relatively to the platen, while the pins 93 thereon, moving in the slots 89 from the position shown in Fig. 7 to that shown in Fig. 8, cause the platen to move relatively to the printing beds to engage with the type thereon. The outer end of the member or lever 98 is attached to a rod 107 connecting the cores of oppositely arranged electromagnetic operating devices or solenoids Y and Y' whereby it is moved in one direction to operate the printing mechanism and in the other to restore the parts. The yoke frame 90 is held in the normal position, shown in Fig. 7, by means of a spring 110.

The ribbon of paper is arranged upon a reel supported at 115 on the frame and it passes upward in rear of the printing mechanism and between the feeding rollers 116 and 117 journaled on the frame 86, as shown in Figs. 4 and 35. The roller 117 is provided at one end with a ratchet wheel with which engages a pawl 118 carried upon a plate 119, oscillated by means of a lever 120, attached to an arm 121 on the yoke frame 90. The roller 116 is supported in pivoted arms 122 and it is held in engagement with the coöperating feeding roller by means of a spring 123. 124 indicates a small pawl attached to the frame 186 which also engages the teeth on the roller 117 to prevent its accidental rearward movement. The ribbon of paper indicated by 129 extends between the rollers 116 and 117 beneath the platen 87 in rear of a finger 125 on arm 126, which extends over the printing wheels and beyond the platen 87. At its opposite extremity the arm is provided with a stud or projection 127 which coöperates with a notch 128 in the plate 119, so arranged that the finger is depressed, as shown in Fig. 8, during the printing operation and elevated thereafter, as shown in Fig. 7, carrying with it the paper as it is fed forward to expose the printed impression thereon in sight of the operator.

At the completion of each operation of the counter wheels, the stop plate 20 and the shift plate 22 are returned to their normal position, as shown in Fig. 3, by means of a resetting bar or lever 131 carried in arms 132, journaled on the shaft 28, one of which is provided with a downwardly extending end 133 attached to the core 134 of a helix or solenoid Z, whereby as said arm is operated from the position shown in dotted lines to that shown in full lines in Fig. 4, the levers 27 and the parts attached thereto will be returned to normal position. The resetting or returning of the operating keys to their normal position is accomplished by means of a releasing bar 140 which is guided in the frame 1, beneath the swinging locking bars 4, and it is provided with fingers or projections 141 (Fig. 9) adapted to engage therewith. As it frequently occurs that it is desirable to repeat a number already indicated upon the counting wheels, I provide means which may be operated manually for preventing the disengagement of the operating keys. The releasing bar 140 is mounted upon a sliding bar 142 longitudinally movable in the frame and provided with the inclined portions 143 which when the bar is moved outwardly, as shown in dotted lines in Fig. 9, allows it to fall and the bar 140 riding thereon to be moved a sufficient distance to carry the fingers 141 out of operative position beneath the locking bars 4. The releasing bar has attached at its outer end a pivoted lever 144 (see Fig. 10) having an angular outer end 145 held in operative engagement with a finger or projection 146 on the lever 54 by means of a spring 147 whereby as the lever is moved to operate the carrying mechanism the operating keys are also released.

The electromagnetic devices by which the various mechanisms of my machine are operated are illustrated in the form of solenoids, a form preferably employed on account of the small space they occupy and also because of the convenience in locating them at various points to obtain their greatest effectiveness, but it will be understood that other motive power may be employed to obtain the same results. As before explained the operating keys when depressed set the levers 8 in such position that the spirally stepped stop plates 20 will engage therewith when the counter wheels are separately operated, the movement of the latter in turn simply sets the pawls 47, by tripping the latches 50, the carrying mechanism being operated by separate devices. The movement of the counter mechanism also operates the printing beds, the inking of the type and the operation of the platen being governed by an operating device of its own. These various parts being operated by separate solenoids, I provide a controlling key and switch devices whereby they may be controlled and the parts operated in their proper order to accomplish the office of each and in the end return them all to their normal positions.

The circuits for controlling the various devices lead from a suitable generator, such as a battery V, and consist of wires $e$ and $f$, the first of which is connected to the terminals of a main or controlling switch E passing thence through the helices or magnets W. The wire $f$ completes the circuit through the latter and it is also connected in parallel with the various magnets X, Y, Y′ and Z by branch circuits $x$, $y$, $y'$ and $z$, as shown particularly in Figs. 4 and 34. The circuit through the magnet X is completed through the wire $x'$ connecting with the terminals of a switch G, operated by a lever $g$ connected to the lever 133, and thence it leads through a contact point or insulated pin $x^2$ on the lever 98. Pivoted on the side of the frame 1 is a spring operated contact member 149, adapted to engage the pin $x^2$, and connected thereto is a conductor $x^3$ leading to a terminal $x^4$ in the secondary switch member F and by said mechanism adapted to be connected with the line wire $e$ to complete the circuit through the helix X. The circuit from the magnet Y is also completed through the conductor $y''$ which leads to the terminal $x^4$. A current passing over the circuits described at the present time operates all of the devices with the exception of the magnet Y′ which controls the operation of the inking pad, the platen and the paper feeding devices and in order that these parts may not be operated until the completion of the operation of the counter wheels, I extend the circuit from said magnet through separate automatic switches adapted to be operated by the separate counter mechanisms. For this reason the several setting levers 8 are insulated from each other and also from the frame of the machine, as shown by the heavy lines in Figs. 23 and 25. These levers are provided at their upper ends with insulated brackets 150 with pivoted contact fingers 151 extending over the ends of the levers and adapted to form an electrical connection therewith when engaged by one of the notches on the coöperating stop plate 20. The outer ends of the levers are provided with weights 152 which are gravity operated into the position shown in dotted lines in Fig. 23 to normally hold the contact fingers out of engagement with the levers to break the circuit passing through them. The wire or conductor leading from the magnet Y′, indicated by $y^2$, is connected to one of the brackets 150 each of which is connected with the next adjacent stop lever by conductors $y^3$, the circuit being completed through the conductor $e$, connected to the last of said levers, as will be understood from an inspection of the diagrammatic view illustrated in Fig. 34. From this arrangement it will be seen that a current can only be passed through the magnet Y′ to operate the inking and printing devices when all of the contact fingers on the several stop devices or levers are closed.

In Figs. 27 to 32 the controlling key H and the switches E, F have been illustrated, and the detail description of these parts will now be made. The main switch E embodies a segmental plate containing the contacts $e^2$, $e^2$, shown in Fig. 32, with which coöperates a movable contact arm $e^3$. This arm is pivoted to the frame at 153 and it is provided with pins or studs 154 between which extends a weighted operating arm 155 also journaled on the stud and provided with a pin 156. A latch member 157 is pivoted to the frame 1 and is adapted to coöperate with the pin 156 to hold the movable switch member $e^3$ in engagement with its coöperating contacts and it is provided with a foot or extension 158 arranged to be engaged and operated by the lever 60, in such a manner as to automatically open the switch E at the proper time, as will be further described. The switch E is normally open and it is closed by the manual operation of the controlling key H, the lower end thereof being provided with a pivoted pawl or dog 159 which as the key is moved downwardly engages the end of the lever or arm 155 and operates the switch from the positions shown in Figs. 4 and 30 to that shown in Figs. 27 and 34 in which position the switch E remains until the completion of all of the other operations of the various parts of the machine. The switch F embodies a segmental plate having two insulated contacts or terminals $f^3$, $f^4$, to which the ends of the conductor $e$ are attached, and a third contact plate $x^4$, to which the conductor $x^3$ is connected. The movable member coöperating with these several contacts is in the form of a plate $f^5$, pivoted to a stud 160 on the frame 1, and adapted to be arrested in the normal position, by a stop 165, closing the circuit through the contacts $f^4$ and $x^4$ thereby placing the magnet Y in circuit and permitting the lever 98 to be operated to restore the parts controlled thereby to the normal position. On the side of the movable member $f^5$ is a pin 166, shown in dotted lines in Figs. 27 and 29, with which coöperates the beveled end 167 of an operating latch 168 pivoted on the key H, whereby the member $f^5$ is revolved on its pivot to the position shown in Fig. 27 to connect the contacts $f^3$, $f^4$ to close the circuit through the solenoids W whereby the several counter wheels are operated when the key H is depressed as shown in Figs. 27 and 28. The latch 168 is operated laterally of the key H by a spring 168' carrying at its end a pin $h$ bearing against the lower end of the latch to move the latter in line with the pin 166. An offset 169 is provided in the latch to permit the switch member to be returned, as will be presently described, to its normal position before the controlling key has been released and the latch 168 carried from the operated position, shown in Figs. 27 and 28, to the normal position shown in dotted lines in Fig. 29. At one side of the member is provided a foot or extension 170 and adapted to coöperate therewith is a finger or projection 171 on the lever 98 and which engages therewith to return it to its normal position at the completion of the printing operation thus breaking the circuit through the electromagnetic devices W and Y to allow the computing mechanism to be restored to its normal position in readiness to perform a subsequent operation.

The operation of the device will now be readily understood. The operator desiring to add a certain numeral or numerals depresses the corresponding keys in the respective units, tens and hundreds rows and which are indicated by A, B, C and D, and to enable a more comprehensive understanding of the operation of all the devices, the various movements through which they pass will be considered in the actual operation of indicating the arbitrary number, which is 6420. This will be indicated by the operator depressing the keys numbered 6, 4 and 2 in the rows D, C and B. As each of these keys are depressed they are held in the operative position by their abutments 3 engaging beneath their respective locking bars 4. If now the operator inadvertently or by accident had depressed the wrong key or keys in one or more of the rows, the mistake could be rectified by subsequently depressing the right key or keys, for as the latter are moved downwardly their locking bars would be disengaged from the keys previously operated, allowing said keys to return to their normal position when the bars would subsequently engage the last operated keys.

As the several keys are depressed the respective setting bars 6 are moved by the action of the cams 11 on the pins 10 shifting the levers 8, to which they are attached, and setting them so that their upper ends are moved relatively to the center of rotation of the stepped stop plates 20 which is the shaft 13. As a current is passed through the solenoids W the counter actuators 27 are operated to revolve the counters and their stop plates into engagement with the setting levers. This movement of the actuator is transferred through the shafts B', C' and D' to the printing beds $b'$, $c'$ and $d'$ so that the respective numerals 6, 4, 2 and 0 on each are arranged in the printing position beneath the platen 87.

Up to this time the counter wheels $a$, $b$, $c$ and $d$ have remained in their normal position and are only operated to bring the characters upon their peripheries into view beneath the aperture 12 when the motor devices W are set in operation and the latter being electromagnetic devices are governed by the circuit previously described and which is controlled by the operating key H. By depressing the key H the cam surface 167 on the latch 168 engages the pin 166 on the movable plate $f^5$ and revolves it from the position shown in Fig. 29 to that shown in Fig. 27, connecting the terminals $f^3$ and $f^4$. Simultaneously the dog or pawl 159, on the lower end of the key H, engages the end of the operating arm 155 revolving the latter from the position shown in Fig. 30 to that shown in Fig. 27 in which it is locked by the latch 157 with the movable contact arm $e^3$ engaging the contact points, $e^2$, $e^2$, and completing the electric circuit through the conductors $e$ and $f$ to the solenoids W. The electric current passing through the latter causes the cores 29 to be drawn inwardly revolving the pinions 13 and the stop plates 20 until they are arrested by one or another of the steps thereon engaging their respective levers 8. As the magnets W operate all of the arms 27, one or another of the several steps on each stop plate engages the respective contact finger 151, moving it into engagement with its lever 8. If none of the keys of any row are operated, the setting lever on said row remains in normal position to be engaged by the first step, indicating zero on the counter, which will close the contact point 151. In indicating the number selected, 6420, none of the keys in the row A have been operated, the parts therefor remain at the zero position, as shown in Fig. 3, although its motor device W actuates the stop 20 and closes the switch formed by the lip 151 on its respective setting arm, while the second, fourth and sixth keys respectively in the rows B, C and D have been operated. The stop plates 20 on the several counter wheels $b$, $c$, and $d$ will have been moved through two spaces (see Fig. 23), four spaces and six spaces respectively. It will be remembered however that the counter wheels are revolved continuously in the same direction by their respective stop plates which are operated a distance of from one to nine spaces. These are then returned to the zero position by an oscillatory movement, the engagement and disengagement of the pawl 15 being accomplished by the movement of the shift plate 22, both the latter and the stop plate being returned to their normal position by suitable resetting mechanism operating on the actuator levers 27 as will be hereinafter described.

The printing operation occurs subsequently to the movement of the counter wheels and it is effected by a current passing through the magnet Y'', the circuit thereto from the battery V consists of the conductors indicated at various points by the reference letters $f$, $y'$, $y^2$ and $e$, the latter wire passing through both the switches E and F. This circuit it will be seen is provided with a number of separate controlling switches, on the several levers 8, and will therefore be opened unless the contact fingers 151 are held in their normal closed position by one or another of the steps on the stop plates 20 when the latter have been operated into engagement therewith. The current flowing through the magnet Y' causes the rod or core 107 to be moved upwardly carrying with it the end of the lever 98. At the beginning of this movement the pivoted trip arm 99 engages the end 94, on the frame 91, causing the inking pad 92 to engage the type on the printing wheels, when the arm 99 is disengaged and the end of the slot 100 engages the pin 105, on the frame 91, moving the parts from the position shown in Fig. 7 to those shown in Fig. 8. During this movement the pins 93 have traveled along the slots 89 and the frame, carrying the platen 87, has been revolved bringing the latter forcibly into contact with the numerals on the printing beds. This downward movement of the platen carries with it the strip or ribbon of paper, indicated by 129, and the downward movement of the yoke frame 90 also oscillates the plate 119, which sets the pawl 118, in position to advance the feeding roll 117 when the parts are returned to the normal position. The finger 125 is lowered and raised again to raise the paper by the pin 127 dropping into the notch 128 on the plate 119, which occurs with the upward movement of the platen away from the printing wheels, thus exposing the numerals printed on the ribbon, as will be understood from Figs. 4, 7 and 8.

The lever 98 as it reaches the limit of its upward movement returns the switch F to its normal position breaking the circuit through the magnet Y' and connecting the contacts $f^4$ and $x^4$ to complete the circuit through the magnet Y, composed of the conductors $e$, $x^3$, $y''$, $y$ and $f$ and generator $v$, causing the core 107 to be moved downwardly to return the lever 98 and the connected parts to their normal position.

The parts are returned to normal position by means of the electromagnetic device or solenoid Z which is connected to the circuit wires $e$ and $f$ by means of conductors $z$, $z'$, $x'$ (leading to the pin $x^2$ on the lever 98) and the wire $x^3$, connected to the terminal $x^4$, on the secondary controlling switch F. The latter terminal is connected with the contact $f^4$ by means of the switch member $f^5$ which is moved into the normal position by means of the finger 171 on the lever 98 which engages the foot or projection 170 on the switch member when the lever is operated upwardly, as shown in Figs. 27, 29 and 34. The current flowing through the circuit thus formed causes the core 134 to be retracted and the lever 133 to be operated from the position shown in dotted lines in Fig. 4 to that shown in full lines, to return all of the segmental operating gears or counter actuators 26 to their normal position. This reverses the position of the shift plates 22, disengages the pawls 15 from the counter wheels and returns the stop plates 20 to their normal position, leaving these last mentioned parts as shown in Fig. 20. The movement of the lever 133 also closes the circuit of the electromagnetic device operating the carrying mechanism which extends through the switch G. The closing of this switch throws the solenoid X into the circuit consisting of the conductors $f$, $x$ and $x'$, the pin $x^2$ and its contact member 149, the conductor $x^3$, and the wire $e$. As the movable contact member 149 has but a limited upward movement it will be seen that the circuits through the helices X and Z are broken by the upward movement of the lever 98, so that during the printing operation there is no possibility of either the resetting or carrying mechanism being operated.

The necessary advancement of the next or relatively higher counter wheel one space when the sum of any two or more numbers on a lower counter exceeds 10, is done by means of the electromagnetic device X through which the current passes to move the levers 60 and 54 which in turn oscillate the frame 35 of the carrying devices, the detailed operation of which has been previously described at length. The lever 60 as it approaches the completion of its movement engages the foot 158 on the latch member 157 disengaging it from the pin 156 allowing the weighted operating arm 155 to gravitate carrying with it the contact plate $e^3$ and disconnecting the main switch E so that the circuits to all of the electromagnetic devices are broken. The movement of the lever 54 operates the releasing bar 140 causing the locking bars 4 to be moved out of engagement with the abutments on the operated keys and the latter are allowed to return to their normal position in readiness for another operation.

I have not claimed herein the construction of the counting or registering mechanism, nor that part of the printing devices embodying the finger extending beneath the ribbon or paper, as these features are reserved to form the subject matter of a separate application.

I claim as my invention—

1. In a calculating machine, the combination with a plurality of keys, a setting member operated thereby and a counter, of a stop plate located at the side of the latter and movable independently of the counter and provided with notches, means for revolving the stop plate, connections between the plate and counter for moving the latter continuously in one direction, and connections between the keys and member for moving said member relatively to the stop plate.

2. In a calculating machine, the combination with a plurality of keys, a setting member operated thereby and a counter, of a stop plate located at the side of the latter and movable independently of the counter and provided with stepped notches corresponding to the several keys, connections between the keys and member to operate the latter into position to arrest the plate in a position corresponding to the key operated, means for operating the stop plate and devices operated by the latter for moving the counter continuously in one direction.

3. In a calculating machine, the combination with a plurality of keys, a setting bar, a cam surface on one of the keys adapted to move the bar through one space and similar surfaces on the other keys adapted to move the bar through a successive number of such spaces, of a counter wheel, a stop plate connected thereto having steps or notches formed spirally thereon, means for revolving the stop plate and a pivoted setting member coöperating with the latter and operated by the setting bar.

4. In a calculating machine, the combination with a plurality of operating keys arranged in rows, a counter and a stop plate connected thereto and provided with notches, of a setting bar operated by the keys, a locking bar coöperating with the latter to retain a key in the operated position, and a member controlled by the bar and coöperating with the stop plate.

5. In a calculating machine, the combination with a plurality of keys arranged in rows, counters for each row and stop plates located at one side of the counters and movable independently of the counters, devices operated by the keys for controlling the movement of the latter and means for oscillating the stop plates, of devices operated by said plates for moving the counters continuously in one direction, and carrying mechanism between adjacent counters.

6. In a calculating machine, the combination with a plurality of keys arranged in rows, a counter revoluble in one direction and an oscillatory stop plate for each row, means for oscillating the plate and clutch devices operated by the stop plates for revolving their respective counters, of devices operated by the keys for limiting the movement of the stop plates, operating devices for each counter normally out of engagement therewith and means controlled by the relative lower adjacent counters for actuating them into the operative position.

7. In a calculating machine, the combination with a plurality of keys, arranged in rows, a counter and a stop plate for each row, constituting relative higher and lower counters, means for oscillating the plate and connections between the latter and the counters for revolving them in one direction, of devices operated by the keys for limiting the movement of the stop plates, a carrying mechanism and operating devices thereon adapted to engage the counters and means operated by the lower counters for actuating said devices into engagement with their relatively higher counters.

8. In a calculating machine, the combination with keys arranged in rows, a counter for each row, those in adjacent rows constituting relatively higher and lower counters, and means controlled by the keys for operating their respective counters, of a pivoted carrying frame oscillating relatively to all of the counters, engaging members supported on the frame and adapted to coöperate with the counters, devices normally holding the members on the frame out of contact with the counters, means controlled by the lower counters for actuating the members into operative position with their relative higher counters and means for oscillating the carrying frame in one direction to move the members and rotate the counters.

9. In a calculating machine, the combination with keys arranged in rows, a counter for each row, those in adjacent rows constituting relatively higher and lower counters and means controlled by the keys for operating their respective counters, of a pivoted carrying frame oscillating relatively to all the counters, pawls thereon adapted to coöperate with the counters and latches carried on said frame for normally holding them out of engagement therewith, means operated by the lower counter wheels to release the latches and set the pawls into engagement with their relative higher counters and means for operating the carrying frame in one direction to rotate the counters with which said pawls engage.

10. In a calculating machine, the combination with a plurality of relatively arranged higher and lower revoluble counters and keys for operating them, of locking devices therefor, carrying mechanism controlling said devices embodying a frame movable concentrically to the counters, pawls supported on the frame and coöperating with the counters and latches mounted on the frame for holding the pawls out of engagement with the counters, said latches being operated by the lower counters to set the pawls upon the relative higher counter of each and means for operating the carrying mechanism.

11. In a calculating machine, the combination with a plurality of counters, keys controlling the operation of the latter and locking devices for the keys, of a carrying mechanism operating between the counters, means for operating the carrying mechanism and connections between the carrying mechanism and the locking devices for operating the latter to release the keys.

12. The combination with a plurality of counters, keys controlling the operation of the latter and devices for locking the keys in the operated position, of a carrying mechanism operating between the counters, key releasing devices coöperating with the locking devices and means for operating the carrying mechanism independently of the keys and connections between said mechanism and the releasing devices.

13. The combination with a plurality of counters, a plurality of operating keys for each having abutments thereon and locking bars adapted to engage the abutments, of a carrying mechanism between the counters, a releasing bar coöperating with the several locking bars to release the keys, means for operating the carrying mechanism and operating connections between the latter and the releasing bar.

14. The combination with a plurality of counters, operating keys for each having abutments thereon and locking bars adapted to engage the latter to retain the keys in the operated position, of a carrying mechanism between the counters, a resetting bar coöperating with the locking bars and means for adjusting it into and out of operative position relative to said bars, and devices for operating the carrying mechanism and the resetting bar.

15. In a calculating machine, the combination with a plurality of operating keys arranged in sequence, a counter mechanism and a setting device comprising a lever, a longitudinally movable member operated different relative distances by each key and means actuated thereby for controlling the adjustment of the lever and the counter mechanism, of a printing bed having type characters thereon and operated by the lever, a platen coöperating with the bed and means for operating it.

16. The combination with a plurality of keys and setting devices operated different relative distances by each key, and a printing bed having type characters thereon, of means for operating the bed which coöperates with the setting devices and is limited in its movement by said devices, a movable inking device normally out of engagement with the printing bed, a platen and means for operating the inking device and platen successively into engagement with the bed.

17. The combination with a plurality of keys arranged in notation from one to nine and a setting device operated a distance of one space by the first key and moved different relative increasing distances by each subsequent key, of a movable printing bed having type characters thereon corresponding to the keys, means for adjusting the printing bed which coöperates with the setting device and is limited in movement by it to position the bed with the character thereon corresponding to an operated key in printing position, an inking device normally out of engagement with the printing bed, and a platen, a ribbon passing beneath the latter and adapted to receive an impression, means for operating the inking device and platen and devices for restoring the keys and printing bed to their normal position.

18. The combination with a plurality of keys, a counter mechanism embodying a stop member, a setting lever operated different relative distances by each key for limiting the movement of the stop member, and a printing bed, of means for operating the counter mechanism and the printing bed, a movable inking device, a platen and means for operating the inking device and platen into and out of engagement with the printing bed.

19. The combination with a plurality of keys arranged in rows, counter mechanism for each row embodying a stop member, a setting lever for each row of keys operated different relative distances by each key to limit the movement of their respective stop members, and a printing bed for each row of keys, of means for operating the several counter mechanisms and their corresponding beds, an inking device, a plate, and means for operating the inking device and platen into engagement with the printing beds.

20. The combination with a plurality of keys arranged in rows and a printing bed for each row of keys, of longitudinally movable members operated different relative distances by the separate keys, of levers operated by the members, printing beds, means for operating them coöperating with and limited in movement by the levers, an inking device and a platen and means for operating the latter relatively to the bed.

21. The combination with a plurality of keys, setting devices operated different relative distances thereby and a movable printing bed operated by said devices, of a frame having a supplemental movable frame thereon provided with an inking pad and a movable platen, a prime mover, tripping connections between it and the supplemental frame and connections between the prime mover and platen causing the latter to engage the printing bed after the operation of the inking pad and devices for operating the prime mover.

22. The combination with a plurality of keys, devices operated different relative distances thereby and a movable printing bed operated by said devices, of a movable frame carrying a supplemental frame provided with an inking pad, a platen and connections between it and the supplemental frame, a latch for locking the movable frame in its normal position and an operating lever, a tripping member on the latter engaging the supplemental frame to move the inking pad into engagement with the bed, means for releasing the movable frame and engaging devices between said frame and lever whereby the former is operated by the latter after the disengagement of the tripping member and means for operating the lever.

23. The combination with a plurality of keys, setting devices operated different relative distances thereby and a movable printing bed operated by said devices, of a shaft, a movable yoke frame journaled thereon and a device for holding it in its normal position, a supplemental frame pivoted on the yoke frame and provided with an inking pad, a lever journaled on the shaft and a tripping member carried thereon and coöperating with the supplemental frame, a movable platen, connections between it and the supplemental frame whereby the latter is moved relatively from beneath the platen and the platen is moved into engagement with the printing bed, means on the lever for releasing the yoke frame and devices for operating the lever.

24. In a calculating machine, the combination with a plurality of keys, counter mechanism embodying a stop plate and setting devices actuated by the keys and coöperating therewith, of an electromagnetic device for operating said stop plate, a circuit and a key therein for controlling the operation of the stop plate.

25. In a calculating machine, the combination with a plurality of keys, counter mechanism embodying a stop plate and setting devices actuated by the keys and coöperating therewith, of mechanism for rotating said stop plate and an electromagnetic device for operating said mechanism, a circuit leading to said device and a key arranged in the circuit for controlling the operation of the counter.

26. In a calculating machine, the combination with a plurality of keys, counter mechanism embodying a stop plate provided with a pinion and an actuating gear wheel engaging therewith, setting devices operated by the keys and coöperating with the stop plate, of an electromagnetic device connected to the gear wheel, a circuit leading to said device and a switch arranged in the circuit for controlling the operation of the counter.

27. In a calculating machine, the combination with a plurality of keys, counter mechanism and devices actuated by the keys for limiting its movement, of an electromagnetic device for operating the counter, resetting mechanism, and a similar device for operating it, a circuit embodying a current generator connected to the first mentioned electromagnetic device, a second circuit leading from the second electromagnetic device, a switch embodying the terminals of both circuits and a movable member coöperating with said terminals to close the separate circuits.

28. In a calculating machine, the combination with a plurality of keys, counter mechanism controlled thereby and actuating and resetting mechanism therefor, of electromagnetic devices for operating the actuator and resetting mechanisms, separate circuits for each device and a generator therein, a normally open switch controlling a current on both circuits, a secondary switch for closing one or the other of said circuits and a controlling device for operating both switches.

29. In a calculating machine, the combination with a plurality of keys, counter mechanism and devices set by the keys for limiting its movement, a counter actuator and resetting mechanism therefor, of separate electromagnetic devices for the counter actuator and resetting mechanism, separate circuits therefor and a main switch normally open and controlling both circuits, a secondary switch embodying terminals of both circuits and a movable member coöperating with said terminals and an operating key controlling both switches.

30. In a calculating machine the combination with a plurality of keys, counter mechanism and devices set by the keys for limiting its movement, a counter actuator and resetting mechanism therefor, of separate electromagnetic devices for operating the counter actuator and resetting devices, a circuit for each device and a main switch controlling both circuits, a secondary switch embodying terminals of both circuits and a movable member coöperating therewith, a controlling key operating to close the main switch and to shift the member of the secondary switch to close the two circuits.

31. The combination with a plurality of keys, counter mechanism and setting devices coöperating therewith and operated by the keys for limiting its movement, and a counter actuator, a printing bed operated by the counter mechanism, a platen and an operating member for moving it relatively to the printing bed, of electromagnetic devices for moving the counter actuator and the platen operating member, a circuit leading to the device for operating the counter actuator having a generator therein, a similar circuit leading to the device for moving the operating member, a switch for closing the first mentioned circuit and an automatic switch for closing the other circuit operated upon the completion of the movement of the counter mechanism.

32. The combination with a plurality of keys, counter mechanism and setting devices coöperating therewith and operated by the keys for limiting the movement of the counter, and a counter actuator, a printing bed operated by the latter, a platen and an operating member for moving it relatively to the printing bed, of an electromagnetic device for operating the counter actuator, a similar device for moving the operating member and a circuit leading from the first device having a generator therein and provided with a switch, a similar circuit for the second device provided with a switch controlled by the movement of the counter.

33. The combination with a plurality of keys, counter mechanism and setting devices coöperating therewith and operated by the keys for limiting its movement and a counter actuator, a printing bed operated by the latter, a platen and an operating member for moving it relatively to the bed, of an electromagnetic device for operating the counter actuator, a similar device for moving the operating member and a circuit leading from the first device having a generator therein and a similar circuit for the second device, a main switch normally open and controlling the two circuits, a secondary switch in the first mentioned circuit, means for closing both switches, and an automatic switch arranged in the second circuit and operated upon during the movement of the counter mechanism.

34. The combination with a plurality of keys, counter mechanism embodying a stop plate and a setting device operated by the keys and coöperating with the stop plates, and contact members on the setting device adapted to be operated by the stop plate, of a counter actuator, an electromagnetic device for operating it and a circuit connected thereto having a switch arranged therein, a printing bed, a platen coöperating therewith and an operating member therefor, an electromagnetic device for operating said member, a circuit connected thereto and leading through the switch members, means for closing the switch in the first named circuit and a generator for supplying current to both circuits.

35. The combination with a plurality of keys arranged in rows, a counter mechanism for each row embodying a stop plate and setting devices operated by the keys and coöperating with the plate to limit the movement, contact members arranged on said devices and normally closed together by the stop plates, and a counter actuator, of an electromagnetic device for operating it, a circuit connected thereto and a normally open switch arranged therein, a printing bed a platen coöperating therewith and a member for operating it, an electromagnetic device for operating said member, a circuit connected thereto and leading through the several contact members on the setting devices, a current generator and means for closing the first mentioned circuit to operate the counter mechanism and close the second circuit.

36. The combination with a plurality of keys, a counter mechanism embodying a stop plate and a setting device coöperating with the latter and operated by the keys, contact members on said devices and normally held in the closed position by the stop plate and a counter actuator, of a resetting mechanism, a printing bed and an operating member therefor, separate electromagnetic devices and circuits for the counter actuator, the resetting mechanism and bed operating member and a switch having terminals for the first two mentioned circuits, a contact member and means for operating it to close said circuits successively, a circuit connected to the electromagnetic device for moving the bed operating member leading through the contact members on the setting devices and a generator connected to said circuits.

37. The combination with a plurality of keys, a counter mechanism, an actuator therefor, and a resetting mechanism, a printing bed, a platen coöperating with the latter and a member for operating it, of electromagnetic devices for operating the actuator and member, circuits leading from the latter and a generator therein, a similar electromagnetic device for operating the resetting mechanism, a circuit leading therefrom and a switch embodying terminals of the three circuits and a contact plate coöperating therewith adapted to be manually operated to close the first mentioned circuits and to be automatically operated by said member to close the circuit of the electromagnetic device of the resetting mechanism.

38. The combination with a plurality of keys, arranged in rows, a plurality of counter mechanisms, actuators therefor and printing beds operating the latter, a platen coöperating with the beds, and a member controlling it, carrying mechanism coöperating with the counter mechanism and an electromagnetic device for operating the carrying mechanism, of similar devices for controlling the movement of the counter actuators and the platen operating member, circuits leading through the last two mentioned devices, a generator therein and switches for closing said circuits successively, a similar circuit leading to the electromagnetic device controlling said carrying mechanism and terminals in said circuit operated to break the latter when the platen member is operated.

39. The combination with a plurality of keys arranged in rows, a counter mechanism for each row, actuators therefor and printing beds operated thereby a platen coöperating with the bed and a member controlling it, carrying mechanism coöperating with the counter mechanism, an electromagnetic device for operating the former, a switch having contacts opened and closed by said bed operating device and resetting mechanism for the actuators, of electromagnetic devices for controlling the movement of the actuators, the platen operating member and resetting mechanism, circuits for each, terminals for the circuit for the last mentioned device operated by the movement of the platen member, a switch controlled by the movement of the resetting electromagnetic device and arranged in the circuit connected to the electromagnet for operating the carrying mechanism and a generator connected to the several circuits.

40. The combination with a plurality of counters setting devices for limiting their movement and actuators for operating them and resetting mechanism therefor, carrying mechanism operating between the counters, printing beds, a platen coöperating therewith and a lever for operating it, a generator, of electromagnetic devices for operating the actuators, the resetting mechanism and the platen lever, circuits leading from the generator through each of the devices, and a main switch normally open and controlling all the circuits having a contact member and a latch for holding it in the closed position, a secondary switch embodying terminals of all the circuits, a contact member coöperating therewith and a controlling key for operating the contact members of both switches, an electromagnetic device for operating the carrying mechanism, a circuit leading thereto and an arm operated thereby and engaging the latch to automatically open the main switch.

41. In a calculating machine, the combination with a counter mechanism comprising spaced stops, an electromagnetic device coöperating directly with said mechanism to revolve the counter, of a plurality of keys, devices controlled thereby and coöperating with said stops for arresting the movement of said electromagnetic device in different positions and means governing the operation of said device.

42. In a calculating machine, the combination with a plurality of counter mechanisms and means for revolving them, comprising an electromagnetic device for each counter, of a plurality of keys coöperating with each counter to arrest it in different positions when operated by said device, and means governing the operation of the several electromagnetic devices.

43. In a calculating machine, the combination with a plurality of counter mechanisms and a plurality of keys, for each counter controlling its movement, of an electromagnetic device for operating each counter, a circuit leading through the several electromagnetic devices, embodying a current generator and a switch for controlling said circuit.

44. In a calculating machine, the combination with a counter mechanism and a printing bed, of separate electromagnetic operating devices for the counter and bed and keys for controlling the movement of said parts.

45. In a calculating machine, the combination with a printing bed, of an electromagnetic operating device connected to the bed, keys controlling the movement of the bed and means for controlling the operation of the electromagnetic device.

46. In a calculating machine, the combination with a plurality of keys, a printing bed controlled thereby and an electromagnetic operating device therefor, of a platen coöperating with the bed and a similar device for operating it and means for controlling the operation of both of said devices.

47. In a calculating machine, the combination with a plurality of keys, a printing bed controlled thereby and an electromagnetic operating device therefor, of a platen coöperating with the bed and a similar device for operating it, circuits embodying a generator and extending through both of said devices and switches arranged in said circuits.

48. In a calculating machine, the combination with a plurality of keys, a counter mechanism and a printing bed controlled by said keys and an electromagnetic operating device for the bed, of a platen, a similar device for operating it, circuits embodying a generator leading through both of said devices and a switch operated by the counter and arranged in one of the circuits for controlling the operation of the platen.

49. In a calculating machine, the combination with a plurality of keys, a counter mechanism and a printing bed controlled by said keys and an electromagnetic operating device for the counter and bed, of a platen, a similar device for operating it, and a generator, a circuit leading through the first mentioned device, a separate circuit leading through the other device and a switch in said circuit controlled by the operation of the counter.

50. In a calculating machine, the combination with a plurality of keys arranged in rows, a counter mechanism and a printing bed for each row and means for operating the counter and bed, of a platen, an electromagnetic device for operating it, a circuit embodying a generator and a plurality of switches arranged in said circuit and operated by the several counters to control the operation of the platen.

51. In a calculating machine, the combination with a plurality of keys arranged in rows, a counter mechanism, and a printing bed for each row and electromagnetic operating devices for the counters and beds, of a platen, an electromagnetic device for operating it, a circuit embodying a generator and extending through the last mentioned device, and provided with switches operated by the counters, a circuit leading through the first mentioned electromagnetic device and a switch for controlling said circuit.

52. In a calculating machine, the combination with a plurality of keys, a printing bed and a counter mechanism controlled thereby and means for operating it, of a platen, an electromagnetic device for operating it and a similar device for restoring the platen, a circuit embodying a generator leading through the first mentioned device and a switch in said circuit controlled by the counter, a similar circuit for the other device and a switch therein operated by the platen operating devices.

53. In a calculating machine, the combination with a plurality of keys, a printing bed controlled thereby and means for operating it, a platen, an electromagnetic device for operating the platen, and a separate electromagnetic device for restoring it, of two circuits embodying a generator and extending through said devices, and a switch for closing the circuits successively through said devices.

54. In a calculating machine, the combination with a plurality of keys, a printing bed controlled thereby, a platen coöperating therewith having an operating arm, of an electromagnetic device for operating the arm to restore the platen, a circuit embodying a generator and leading through said device, means for operating the arm to actuate the platen and a switch automatically operated by the arm to close the circuit through said device.

55. In a calculating machine, the combination with a plurality of keys, a printing bed controlled thereby, a platen coöperating therewith, having an operating arm, of an electromagnetic device for operating the arm to restore the platen, a circuit embodying a generator and leading through said device, means for operating the arm to actuate the platen and a switch automatically operated by the arm to close the circuit through said device.

56. In a calculating machine, the combination with a plurality of keys, a printing bed controlled thereby, a platen coöperating therewith having an operating arm, of separate electromagnetic devices for operating the arm in opposite directions two circuits embodying a generator and leading through said devices and a switch adapted to successively close said circuits to operate the platen into and out of engagement with the printing bed.

57. In a calculating machine, the combination with a plurality of keys, a printing bed controlled thereby, a platen coöperating therewith, having an operating arm, of separate electromagnetic devices for operating the arm in opposite directions two circuits embodying a generator and leading through said devices, and a switch adapted to be operated to close one circuit to operate the arm and move the platen into engagement with the printing bed and to be automatically operated to close the other circuit and cause the platen to be restored.

58. In a calculating machine, the combination with a plurality of keys, counter mechanism controlled thereby and an electromagnetic device for operating the latter, of a resetting mechanism for the counter and a similar device for operating it, circuits embodying a generator and leading through said devices and a switch for closing them.

59. In a calculating machine, the combination with a plurality of keys, counter mechanism and a printing bed controlled by said keys, a platen, an electromagnetic device for operating the counter and bed and a similar device for operating the platen, of resetting mechanism for the counter, an electromagnetic device for operating it, a circuit leading through the latter and a switch therein controlled by the platen operating device, circuits leading through the operating devices of the counter and bed and platen, a switch for controlling them and a current generator.

60. In a calculating machine, the combination with a plurality of keys arranged in rows, a counter for each row and a carrying mechanism common to all of the counters, of an electromagnetic operating device for the carrying mechanism, a circuit leading through said device embodying a generator, a switch in said circuit and means separate from the counters for closing said switch.

61. In a calculating machine, the combination with a plurality of counter mechanisms, means for operating them and a plurality of keys coöperating with each counter to limit its movement, of a carrying mechanism common to all of the counter mechanisms and movable relatively toward and from them, an electromagnetic operating device therefor, a circuit leading through said device embodying a generator and a switch in said circuit.

62. In a calculating machine, the combination with a plurality of keys arranged in rows, a counter mechanism for each row controlled by the respective keys therein and means for resetting said mechanism, of a carrying mechanism between the counters, an electromagnetic device for operating said carrying mechanism, a circuit leading through said device embodying a generator and a switch in said circuit controlled in its operation by the resetting means.

63. In a calculating machine, the combination with a plurality of keys arranged in rows, a counter mechanism for each row controlled by the respective keys therein and electromagnetic operating mechanism for resetting the counter mechanism, of a carrying mechanism between the counters, an electromagnetic device for operating said carrying mechanism, a circuit leading through the device for resetting the counter mechanism and contacts controlled by said resetting mechanism, a circuit leading through said contacts and the device for operating the carrying mechanism and a current generator.

64. In a calculating machine, the combination with a plurality of keys, a counter controlled thereby and mechanism for retaining said keys in the operated position, of releasing mechanism for the keys, an electromagnetic operating device connected to said mechanism, a circuit leading through said device embodying a generator and means for controlling said circuit.

65. In a calculating machine, the combination with a plurality of keys arranged in rows, a counter for each row controlled by the keys and carrying mechanism between the counters, of an electromagnetic device for operating the carrying mechanism, means for retaining the keys in the operated position and a device operated by the carrying mechanism for releasing the keys and a circuit embodying a current generator for controlling the electromagnetic device.

66. In a calculating machine, the combination with a plurality of keys arranged in rows, a counter for each row controlled by the keys, means for operating the counters and electromagnetically operated resetting mechanism for said means, of retaining devices for securing the keys in operated position, carrying mechanism between the counters and electromagnets for operating the resetting mechanism and carrying mechanism, a device operated by the latter for releasing the keys, and contacts operated by the former mechanism, a circuit leading through the contacts and the carrying mechanism magnet, a circuit leading through the resetting magnet and a current generator.

67. In a calculating machine, the combination with a plurality of keys arranged in rows, a counter for each row, means for operating them, printing beds controlled by the keys and a platen, means for operating the latter and an electromagnetic device for restoring the platen, of carrying devices between the counters, electromagnets for operating them, and a resetting mechanism for the counters, an electromagnet for operating the resetting mechanism and contacts controlled thereby, a circuit leading through said contacts and the magnet for operating the carrying device, contacts controlled by the platen operating means and a circuit leading through said contacts and through the counter resetting magnet, a circuit leading through the platen restoring magnet, a switch for controlling it and a current generator.

68. In a calculating machine, the combination with a plurality of counter mechanisms, means for operating them, keys for controlling them and carrying devices between the counters, of separate means for operating the carrying devices, printing beds controlled by the counter mechanism, a platen coöperating with the beds, independent means for operating the platen and a device for controlling the relative operation of the counters, carrying devices and platen.

69. In a calculating machine, the combination with a plurality of counter mechanisms, keys and setting devices operated thereby for controlling the movement of the counters, printing beds corresponding to the latter and means coöperating with and limited in movement by the setting devices for operating said beds and counters, of carrying devices between the counters and an electromagnetic device for operating them, a platen coöperating with the beds and an electromagnetic device for operating it, means for restoring the several operating devices to return the counters and beds, the carrying devices and the platen to their normal position and a single controlling member actuating the several operating devices to effect a calculating and printing operation and also to actuate the restoring means.

70. In a calculating machine, the combination with a plurality of keys, a counter mechanism comprising a plurality of spaced stops, and of an electromagnetic device for operating it, of devices set by the keys to coöperate with the stops of said counter mechanism for limiting its movement, a circuit leading through the electromagnetic device embodying a generator and a switch for controlling the circuit.

71. In a calculating machine, the combination with a plurality of keys, a counter mechanism and setting devices actuated by the keys and coöperating therewith, of an electromagnetic device for operating the counter mechanism, a resetting device for the latter and a circuit leading through the operating device embodying a generator, a switch therein, means for operating it to close the circuit and separate devices for operating the switch to break the circuit prior to the operation of the resetting device.

72. In a calculating machine, the combination with a plurality of keys, a counter mechanism and setting devices, of a resetting mechanism, electromagnetic operating devices for the counter and resetting mechanism, circuits extending through said magnetic devices embodying a current generator, a switch, means for operating it to close the circuit through the counter mechanism operating device, separate means for operating the switch to break said circuit and close the circuit through the resetting mechanism operating device.

73. In a calculating machine, the combination with a plurality of keys, a counter mechanism and setting devices actuated by the keys and coöperating therewith, a resetting mechanism and separate electromagnetic devices for operating the counter, and resetting mechanisms, of circuits leading through both of said devices embodying a current generator, a main switch controlling both of said circuits, a secondary switch adapted to alternately open and close them and means for operating the switches.

74. In a calculating machine, the combination with a plurality of keys, a counter mechanism and setting devices actuated by the keys and coöperating therewith, a resetting mechanism and separate electromagnetic devices for operating the counter and resetting mechanisms, of circuits leading through both of said devices embodying a current generator, a main switch controlling both of said circuits, and a key engaging the main switch to close it and coöperating with the secondary switch to close the circuit through the counter mechanism operating device, separate devices for shifting the secondary switch to close the other circuit and means for subsequently opening the main switch.

75. In a calculating machine, the combination with a plurality of keys, a counter mechanism and setting devices actuated by the keys and coöperating therewith, a carrying mechanism coöperating with the counters, resetting mechanism therefor and separate electromagnetic devices for operating the counter, carrying and resetting mechanisms, of circuits leading through all of said devices embodying a current generator, a main switch controlling all of said circuits, means for closing it and a secondary switch adapted to alternately open and close the circuits leading through the operating devices of the counter and resetting mechanisms.

76. In a calculating machine, the combination with a plurality of keys, a counter mechanism and setting devices actuated by the keys and coöperating therewith, a carrying mechanism coöperating with the counters. resetting mechanism therefor and separate electromagnetic devices for operating the counter, carrying and resetting mechanisms. of circuits leading through all of said devices embodying a current generator, a main switch controlling all of said circuits, a secondary switch controlling contacts of the circuits, leading through the operating devices of the counter and resetting mechanisms, a key for engaging the main switch to close it and coöperating with the secondary switch to close one of the circuits controlled thereby, separate devices for operating said switch to close the other circuit and means for opening the main switch controlled by the carrying mechanism.

77. In a calculating machine, the combination with a counter mechanism, keys controlling it and resetting mechanism, of separate electromagnetic devices for operating the counter and resetting mechanisms, separate circuits leading through both of said devices embodying a current generator and a main switch controlling both circuits, a secondary switch adapted to alternately close said circuits and means for controlling said switches.

78. In a calculating machine, the combination with a counter mechanism, keys controlling it and an electromagnetic operating device therefor, of a circuit for said device embodying a current generator, a main and a secondary switch arranged in the circuit and a key for operating both switches.

79. In a calculating machine, the combination with a counter mechanism, keys controlling it and resetting mechanism, of separate electromagnetic devices for operating the counter and resetting mechanisms, separate circuits leading through both of said devices embodying a current generator and a main switch controlling both circuits, means for closing said switch, devices operated by the resetting mechanism for opening it, and means for operating the secondary switch to close both circuits.

80. In a calculating machine, the combination with a plurality of keys arranged in rows, a counter for each row and carrying mechanism, between the counters, of an electromagnetic operating device for the carrying mechanism, a circuit leading through said device embodying a generator and a switch in said circuit, means for opening the switch and separate devices for closing it.

81. In a calculating machine, the combination with a plurality of relatively arranged higher and lower counter mechanisms, a plurality of manually operated keys coöperating with each mechanism, and an electromagnetic device for operating each counter mechanism a distance corresponding to an operated key in its coöperating set of keys, of a carrying device, an electromagnetic operating device therefor, circuits leading through said operating devices and embodying a generator and a switch mechanism controlling said circuits.

82. In a calculating machine, the combination with a plurality of counter mechanisms, keys coöperating therewith and carrying mechanism, of electromagnetic devices for operating the counter and carrying mechanisms, circuits leading through each and embodying a generator and a manually operated switch mechanism controlling the circuits to cause a relatively timed operation of said electromagnetic devices.

83. In a calculating machine, the combination with a plurality of counter mechanisms, keys coöperating therewith and electromagnetic operating devices therefor, carrying mechanism between the counters, resetting mechanism and electromagnetic devices for operating the carrying and resetting mechanisms, of circuits leading through the several electromagnetic devices and embodying a generator and a manually operated switch mechanism controlling said circuits to cause a relatively timed operation of each of the electromagnetic devices.

84. In a calculating machine the combination with a plurality of counter mechanisms, keys coöperating therewith and carrying devices between the counters, printing beds controlled by the keys, a platen coöperating with the beds and a resetting mechanism, of separate electromagnetic devices for operating the counters, carrying mechanism, platen and resetting mechanism, circuits leading through said devices and embodying a generator and a manually operated switch mechanism controlling said circuits.

85. In a calculating mechanism, the combination with a plurality of counter mechanisms, keys coöperating therewith and carrying devices between the counters, printing beds, an electromagnetic device for operating each counter and its corresponding printing bed and a resetting mechanism, of separate electromagnetic devices for operating the carrying and resetting mechanism, circuits leading through each of the electromagnetic devices and embodying a generator and a switch mechanism controlling said circuits to cause a relatively timed operation of the various parts.

86. In a calculating machine, the combination with a plurality of counter mechanisms, keys coöperating therewith and carrying devices between the counters, printing beds controlled by the keys, a platen coöperating with the beds and a resetting mechanism, of separate electromagnetic devices for operating the counter, carrying and resetting mechanisms, an electromagnetic device for moving the platen into engagement with the beds and another for restoring it, circuits leading through said devices and embodying a generator and a switch mechanism controlling said circuits and arranged to cause a relatively timed operation of the various parts.

87. In a calculating machine, the combination with a plurality of counter mechanisms, keys coöperating therewith, carrying mechanism and devices for resetting the counters, of electromagnetic devices for operating the counter and carrying mechanisms and the resetting devices, circuits leading through the electromagnetic devices and embodying a generator, switches controlling the various circuits and means for operating them to force the operation of the counters, the resetting devices and the carrying mechanism.

88. In a calculating machine, the combination with a plurality of counter mechanisms, keys coöperating therewith, carrying mechanism and devices for resetting the counters, of electromagnetic devices for operating the counter and carrying mechanisms and the resetting devices, circuits leading through the electromagnetic devices and embodying a generator, switches controlling the various circuits, means for operating them to force the operation of the counters, the resetting devices and the carrying mechanism, a main switch controlling all of the circuits and means for opening it subsequent to the operation of the several electromagnetic devices.

89. In a calculating machine, the combination with a plurality of counter mechanisms, keys coöperating therewith and carrying mechanism, printing beds, an electromagnet for operating each counter and its respective printing bed and a resetting mechanism, of electromagnetic devices for operating the carrying and resetting mechanisms, a platen, an electromagnet for operating it into engagement with the printing beds, a similar device for restoring it and circuits leading through the various electromagnetic devices and embodying a generator and switch mechanism controlling said circuits.

90. In a calculating machine, the combination with a plurality of counter mechanisms, keys coöperating therewith and carrying mechanism, printing beds, an electromagnet for operating each counter and its respective printing bed and a resetting mechanism, of electromagnetic devices for operating the carrying and resetting mechanisms, a platen, an electromagnet for operating it into engagement with the printing beds, a similar device for restoring it and circuits leading through the various electromagnetic devices and embodying a generator and switch mechanism controlling said circuits, means for operating it to force a relatively timed operation of the various electromagnetic devices, a main switch controlling all of the circuits and means for opening the switch after the operation of the last electromagnetic device.

91. In a calculating machine, the combination with a plurality of counter mechanisms, keys coöperating therewith and carrying mechanism, printing beds, an electromagnet for operating each counter and its respective printing bed and a resetting mechanism, of electromagnetic devices for operating the carrying and resetting mechanisms, a platen, an electromagnet for operating it into engagement with the printing beds, a similar device for restoring it and circuits leading through the various electromagnetic devices and embodying a generator and a main switch controlling all of said circuits, a secondary switch and mechanism and means for operating the main switch to close it and the secondary switch to force a relative timed operation of the electromagnetic devices and means for opening the main switch upon the completion of the operation of the various electromagnetic devices.

92. In a calculating machine, the combination with a counter, keys controlling its operation, a printing bed and a platen coöperating therewith, of means for operating the counter, an electromagnetic device having a circuit controlled by the counter for operating the platen and a device for actuating the counter operating means.

93. In a calculating machine, the combination with a counter, keys controlling its operation, a printing bed and a platen coöperating therewith, of means for operating the counter, devices controlled by the latter, for operating the platen into engagement with the bed, separate devices for restoring the platen controlled by the platen operating devices and a device for primarily actuating the counter operating means.

94. In a calculating machine, the combination with a counter, keys controlling its operation, a printing bed and a platen coöperating therewith, of means for operating the counter, means for operating the platen controlled by the counter, mechanism for restoring the counter controlled by the platen operating devices and a device for primarily actuating the counter operating means.

95. In a calculating machine, the combination with a counter, keys controlling its operation, a printing bed and a platen coöperating therewith, of means for operating the counter, means for operating the platen into engagement with the bed, separate devices for restoring the platen and counter operating means, both controlled by the platen operating devices and a device for primarily actuating the operating means of the counter and platen.

96. In a calculating machine, the combination with a counter, keys controlling its operation, a printing bed and a platen coöperating therewith, of means for operating the counter, devices for operating the platen into engagement with the bed controlled by the counter, a separate restoring device for the platen controlled by the platen operating device, resetting mechanism for the counter operating means actuated upon the return of the platen to normal position and a device for actuating the counter operating means.

97. In a calculating machine, the combination with a counter, keys controlling its operation, a printing bed and a platen co-operating therewith, of means for operating the counter, devices for operating the platen into engagement with the bed controlled by the counter, separate devices for restoring the platen and resetting the counter operating means which are rendered inoperative during the operation of the platen, and a device for actuating the counter operating means.

98. In a calculating machine, the combination with a counter, keys controlling its operation, a printing bed and a platen co-operating therewith, of means for operating the counter, devices for operating the platen into engagement with the bed controlled by the counter, a device for restoring the platen and means for resetting the counter operating means which is rendered inoperative during the operation of the platen and actuated upon its return to normal position and a device for actuating the counter operating means.

99. In a calculating machine, the combination with a plurality of counters, keys controlling them, printing beds, a platen co-operating therewith and carrying devices co-operating with the counters, of means for operating the counters, devices for operating the platen into engagement with the bed controlled by the counters, mechanisms for resetting the counter operating means and operating the carrying devices which are rendered inoperative during the movement of the platen and a device for actuating the counter operating means.

100. In a calculating machine, the combination with a plurality of counters, keys controlling them, printing beds, a platen co-operating therewith and carrying devices co-operating with the counters, of means for operating the counters, devices for operating the platen into engagement with the bed controlled by the counters, separate mechanism for resetting the counter operating means and operating the carrying devices which are rendered inoperative during the movement of the platen, means for restoring the platen and actuating said resetting and carrying device operating mechanisms and a device for actuating the counter operating means.

101. In a calculating machine, the combination with a plurality of counters, keys controlling them, printing beds, a platen co-operating therewith and carrying devices co-operating with the counters, of means for operating the counters, devices for operating the platen into engagement with the bed controlled by the counters, separate mechanism for resetting the counter operating means and operating the carrying devices which are rendered inoperative during the movement of the platen, means for restoring the platen actuated by the platen operating devices and actuating said resetting and carrying device operating mechanisms, and a device for primarily actuating the counter operating means.

102. In a calculating machine, the combination with a plurality of counters, keys controlling them, and carrying devices coöperating with the counters, of means for operating the counters, mechanism for resetting the counter operating means and other mechanism for operating the carrying devices, means governed by the counters for controlling said mechanisms and a device for actuating the counter operating means.

103. In a calculating machine, the combination with a plurality of counters, keys controlling them, locks for the keys and carrying devices between the counters, of means for operating the counters, mechanism for operating the carrying devices and releasing the key locks, means governed by the counters for controlling said mechanism and means for actuating the counter operating means.

104. In a calculating machine, the combination with a plurality of counters, keys controlling them, and carrying devices between the counters, of means for operating the counters, mechanism for resetting said operating means controlled by the counters, other mechanism for operating the carrying devices controlled by the resetting mechanism and means for actuating the counter operating means.

105. In a calculating machine, the combination with a plurality of counters, keys controlling them, a printing bed, a platen co-operating therewith and carrying devices co-operating with the counters, of means for operating the counters, devices for actuating the platen into engagement with the bed controlled by the counters, separate devices for restoring the platen controlled by the platen operating devices, mechanism for resetting the counter operating means controlled by the platen restoring devices, means for operating the carrying devices controlled by the resetting mechanism and a device for primarily actuating the counter operating means.

106. In a calculating machine, the combination with a plurality of counters, keys controlling them, a printing bed, a platen coöperating therewith and carrying devices coöperating with the counters, of means for operating the counters, devices for actuating the platen into engagement with the bed controlled by the counters, mechanism for restoring the platen and other mechanism for resetting the counter operating means, both of said mechanisms being controlled by the platen actuating devices, devices for resetting the counter operating means and mechanism for operating the carrying devices actuated by the movement of the restoring devices and a device for actuating the counter operating means.

107. In a calculating machine, the combination with a counter, keys controlling its operation, a printing bed and a platen co-operating therewith, of means for operating the counter, an electromagnetic device for operating the platen, a circuit leading therethrough embodying a generator, a switch in said circuit adapted to be closed by the operation of the counter and means for actuating the counter operating means.

108. In a calculating machine, the combination with a counter, keys controlling its operation, a printing bed and a platen co-operating therewith, of means for operating the counter, an electromagnetic device for operating the platen controlled by the counter, a circuit for said device embodying a generator and means for actuating the counter operating means.

109. In a calculating machine, the combination with a counter, keys controlling its operation, a printing bed and a platen co-operating therewith, of means for operating the counter, an electromagnetic device for operating the platen into engagement with the bed, a circuit leading therethrough, a separate electro-magnetic device for restoring the platen, a circuit leading through the last mentioned device which is opened and closed by the operation of the platen and a device for actuating the counter operating means.

110. In a calculating machine, the combination with a counter, keys controlling its operation, a printing bed and a platen co-operating therewith, of means for operating the counter, an electromagnetic device for operating the platen into engagement with the bed which is controlled by the counter, a separate electromagnetic device for restoring the platen which is controlled by the movement of the platen and a means for actuating the counter operating means.

111. In a calculating machine, the combination with a counter, keys controlling its operation, a printing bed and a platen co-operating therewith, of means for operating the counter, an electromagnetic device for operating the platen controlled by the counter, a similar device for restoring the counter operating means which is controlled by the operation of the platen, a device for actuating the counter operating means and circuits for said electromagnetic devices embodying a generator.

112. In a calculating machine, the combination with a counter, keys controlling its operation, a printing bed and a platen co-operating therewith, of means for operating the counter, an electromagnetic device for operating the platen into engagement with the bed and controlled by the counter, separate electromagnetic devices for restoring the platen and counter operating means, both controlled by the movement of the platen, circuits for all of said devices embodying a generator and a device for actuating the operating means of the counter and platen.

113. In a calculating machine, the combination with a counter, keys controlling its operation, a printing bed and a platen co-operating therewith, of means for operating the counter, an electromagnetic device for operating the platen into engagement with the bed and controlled by the counter, an electromagnetic device for restoring the platen controlled by the movement of the latter, an electromagnetic resetting mechanism for the counter operating means actuated by the operation of the platen restoring device, circuits for said electromagnetic devices embodying a generator and a device for actuating the counter operating means.

114. In a calculating machine, the combination with a counter, keys controlling its operation, a printing bed and a platen co-operating therewith, of means for operating the counter, an electromagnetic device for operating the platen into engagement with the bed and controlled by the counter, separate electromagnetic devices for restoring the platen and resetting the counter operating means, devices controlled by the platen for rendering the last mentioned electromagnetic devices inoperative during the operation of said platen, circuits for said electromagnetic devices embodying a generator and a device for actuating the counter operating means.

115. In a calculating machine, the combination with a counter, keys controlling its operation, a printing bed and a platen co-operating therewith, of means for operating the counter, an electromagnetic device for operating the platen into engagement with the bed, and controlled by the counter, an electromagnetic device for restoring the platen, a similar device for resetting the counter operating means which is rendered inoperative by the movement of the platen in one direction and actuated by its movement in the other direction, circuits for said electromagnetic devices embodying a generator and a device for actuating the counter operating means.

116. In a calculating machine, the combination with a plurality of counters, keys controlling them, printing beds, a platen coöperating therewith and carrying devices coöperating with the counters, of means for operating the counters, devices for operating the platen which are controlled by the counters, electromagnetic devices for resetting the counter operating means and operating the carrying devices which are alternately rendered inoperative and operative by the movement of the platen, circuits for said electromagnetic devices embodying a generator and a device for actuating the counter operating means.

117. In a calculating machine, the combination with a plurality of counters, keys controlling them, printing beds, a platen coöperating therewith and carrying devices coöperating with the counters, of means for operating the counters, electromagnetic mechanism for resetting the counter operating means and operating the carrying devices, devices controlled by the counters for operating the platen into engagement with the bed and rendering the counter and carrying operating means inoperative, means for restoring the platen and rendering said means operative, circuits for said electromagnetic mechanism embodying a generator and a device for actuating the counter operating means.

118. In a calculating machine, the combination with a plurality of counters, keys controlling them, printing beds, a platen coöperating therewith and carrying devices coöperating with the counters, of means for operating the counters, electromagnetic mechanism for resetting the counter operating means and operating the carrying devices, electromagnetic devices controlled by the counters for operating the platen into and out of engagement with the bed and alternately rendering the counter and carrying electromagnetic mechanism inoperative and operative, circuits for said electromagnetic devices embodying a generator and a device for actuating the counter operating means.

119. In a calculating machine, the combination with a plurality of counters, keys controlling them, printing beds, a platen coöperating therewith and carrying devices coöperating with the counters, of means for operating the counters, an electromagnetic device for operating the platen into engagement with the bed which is controlled by the counters, separate electromagnetic devices for resetting the counter operating means and operating the carrying devices rendered inoperative by the movement of the platen in one direction, an electromagnetic device for restoring the platen actuated by the platen which in turn actuates the counter and carrying electromagnetic devices, circuits for all of said devices embodying a generator and a device for actuating the counter operating means.

120. In a calculating machine, the combination with a plurality of counters, keys controlling them and carrying devices coöperating with the counters, of means for operating the latter, electromagnetic mechanism for resetting the counter operating means and operating the carrying devices, means governed by the counters for controlling the operation of said electromagnetic mechanism, a circuit for the latter embodying a generator and a device for actuating the counter operating means.

121. In a calculating machine, the combination with a plurality of counters, keys controlling them, locks for the keys and carrying devices between the counters, of means for operating the latter, electromagnetic mechanism for operating the carrying devices and releasing the locks, means governed by the counters for controlling said electromagnetic mechanism, a circuit for the latter embodying a generator and means for actuating the counter operating means.

122. In a calculating machine, the combination with a plurality of counters, keys controlling them and carrying devices coöperating with the counters, of means for operating the latter, electromagnetic mechanism for resetting the counter operating means controlled by the counters, similar mechanism for operating the carrying devices controlled by the resetting mechanism, circuits for said mechanisms embodying a generator and means for actuating the counter operating means.

123. In a calculating machine, the combination with a plurality of counters, keys controlling them, a printing bed, a platen and carrying devices coöperating with the counters, of means for operating the counters, an electromagnetic device controlled by the counters for operating the platen into engagement with the bed, an electromagnetic device for restoring the platen controlled by the operating movement of the platen, an electromagnetic device for resetting the counter operating means controlled by the restoring movement of the platen, an electromagnetic device for operating the carrying devices controlled by the resetting movement of the counter operating device, circuits connected to the several electromagnetic devices embodying a generator and a device for actuating the counter operating means.

124. In a calculating machine, the combination with a plurality of counters, keys controlling them, a printing bed, a platen and carrying devices coöperating with the counters, of means for operating the counters, an electromagnetic device controlled by the counters for operating the platen into engagement with the bed, an electromagnetic mechanism for restoring the platen and a similar mechanism for resetting the counter operating means, both of said mechanisms being controlled by the operation of the platen, separate electromagnetic devices for resetting the counter operating means and operating the carrying devices actuated by the restoring movement of the platen, circuits for said electromagnetic devices embodying a generator and a device for actuating the counter operating means.

GEORGE H. SEARS.

Witnesses:
G. WILLARD RICH,
ELIZABETH J. PERRY.